(12) United States Patent
Park

(10) Patent No.: US 9,704,641 B2
(45) Date of Patent: Jul. 11, 2017

(54) MAGNETIC ENERGY-TRANSMITTING ELEMENT AND POWER SUPPLY FOR CANCELLING OUT ELECTRICAL NOISE

(76) Inventor: Chan-Woong Park, Seoul (KR)

( * ) Notice: Subject to any disclaimer, the term of this patent is extended or adjusted under 35 U.S.C. 154(b) by 280 days.

(21) Appl. No.: 13/883,466

(22) PCT Filed: Nov. 7, 2011

(86) PCT No.: PCT/KR2011/008433
§ 371 (c)(1),
(2), (4) Date: May 3, 2013

(87) PCT Pub. No.: WO2012/064063
PCT Pub. Date: May 18, 2012

(65) Prior Publication Data
US 2013/0242452 A1    Sep. 19, 2013

(30) Foreign Application Priority Data

Nov. 9, 2010  (KR) .......................... 10-2010-0111007
Jan. 3, 2011   (KR) .......................... 10-2011-0000051
(Continued)

(51) Int. Cl.
*H01F 27/28*   (2006.01)
*H01F 27/34*   (2006.01)
(Continued)

(52) U.S. Cl.
CPC ............. *H01F 27/33* (2013.01); *H01F 27/40* (2013.01); *H01F 27/38* (2013.01);
(Continued)

(58) Field of Classification Search
CPC ........................... H01F 27/2847; H01F 27/38
(Continued)

(56) References Cited

U.S. PATENT DOCUMENTS 4,335,423 A * 6/1982 Koizumi et al. ........... 363/21.16
4,507,721 A * 3/1985 Yamano ................ H02M 3/335
363/20
(Continued)

FOREIGN PATENT DOCUMENTS

JP   2001-145341      5/2001
JP   2007-524998      8/2007
KR   20-1998-0027241  8/1998

OTHER PUBLICATIONS

English Translation of Abstract of Japanese Patent Application No. JP2001-145341.
(Continued)

*Primary Examiner* — Mangtin Lian
*Assistant Examiner* — Ronald Hinson
(74) *Attorney, Agent, or Firm* — Revolution IP, PLLC

(57) ABSTRACT

The present invention relates to a transmitter and power supply which suffers little EMI deviation and provides adequate margin even in volume production, and which can cut the unit price of transformers and economize on the costs of EMI filters, by cancelling out and eliminating the conducted noise or the conducted noise and radiated noise caused by capacitive coupling between the windings of a transformer, the transformer being of an uncomplicated construction which is good in terms of production.

8 Claims, 19 Drawing Sheets

(30) Foreign Application Priority Data

| | | |
|---|---|---|
| Jan. 3, 2011 | (KR) | 10-2011-0000053 |
| Feb. 10, 2011 | (KR) | 10-2011-0011967 |
| Apr. 4, 2011 | (KR) | 10-2011-0030776 |
| Apr. 19, 2011 | (KR) | 10-2011-0036294 |
| Jul. 25, 2011 | (KR) | 10-2011-0073383 |
| Jul. 26, 2011 | (KR) | 10-2011-0073959 |
| Aug. 5, 2011 | (KR) | 10-2011-0078197 |
| Aug. 5, 2011 | (KR) | 10-2011-0078198 |
| Aug. 24, 2011 | (KR) | 10-2011-0084619 |
| Aug. 24, 2011 | (KR) | 10-2011-0084620 |

(51) Int. Cl.
*H01F 27/33* (2006.01)
*H01F 27/40* (2006.01)
*H02M 1/44* (2007.01)
*H02M 3/28* (2006.01)
*H01F 27/38* (2006.01)

(52) U.S. Cl.
CPC ......... *H01F 2027/408* (2013.01); *H02M 1/44* (2013.01); *H02M 3/28* (2013.01)

(58) Field of Classification Search
USPC .......................................................... 336/180
See application file for complete search history.

(56) References Cited

U.S. PATENT DOCUMENTS 6,717,827 B2 * 4/2004 Ota .............................. 363/21.12
7,130,204 B2 * 10/2006 Tsuruya ...................... 363/56.12
7,256,675 B2 * 8/2007 Chen ....................... H01F 29/14
336/180

OTHER PUBLICATIONS

English Translation of Abstract of Japanese Patent Application No. JP2007-524998.
English Translation of Abstract of Korean Patent Application No. KR20-1998-0027241.
PCT International Search Report, dated Jun. 28, 2012, PCT/KR2011/008433.

* cited by examiner

MAGNETIC ENERGY-TRANSMITTING ELEMENT AND POWER SUPPLY FOR CANCELLING OUT ELECTRICAL NOISE

This application is a U.S. national stage filing of International Application No. PCT/KR2011/008433, filed Nov. 7, 2011, which claims priority to Korean Patent Application Nos. KR 10-2010-0111007 filed on Nov. 9, 2010, KR 10-2011-0000053 filed on Jan. 3, 2011, KR 10-2011-0000051 filed on Jan. 3, 2011, KR 10-2011-0011967 filed on Feb. 10, 2011, KR 10-2011-0030776 filed on Apr. 4, 2011, KR 10-2011-0036294 filed on Apr. 19, 2011, KR 10-2011-0073383 filed on Jul. 25, 2011, KR 10-2011-0073959 filed on Jul. 26, 2011, KR 10-2011-0078198 filed on Aug. 5, 2011, KR 10-2011-0078197 filed on Aug. 5, 2011, KR 10-2011-0084619 filed on Aug. 24, 2011, KR 10-2011-0084620 filed on Aug. 24, 2011, all of which are incorporated herein by reference in its entirety.

BACKGROUND OF THE INVENTION

1. Field of the Invention

The present invention relates to a transformer having a simple structure with a high productivity, and more particularly, to a transformer and a power supply for cancelling out conducted noise or conducted noise and radiated noise due to a capacitive coupling between transformer windings to provide a small EMI deviation and a sufficient margin even during mass production, thereby reducing the unit cost of the transformer, and reducing the cost of the EMI filter.

2. Description of the Related Art

So far, there has been a magnetic energy-transfer element or power supply configured to reduce a displacement current flowing to the electrical ground from the power supply using a cancellation effect due to magnetic energy-transfer element windings. However, five or six strands of thin wire should be stretched and wound to fill one winding layer with no gap using a small number of turns for cancellation. Accordingly, it has may disadvantages in that the winding operation is difficult and the productivity of the transformer is low, thus increasing the unit cost, and in case of a transformer with a low profile form factor, several strands cannot be connected to a pin, and the like. Furthermore, modified shaped methods have been used to get out of the restriction of the height of a transformer having a low profile form factor. In this case, it has a large deviation in the effect of reducing a displacement current flowing to the electrical ground from the power supply, thus causing a disadvantage in that it is difficult to satisfy EMI standards.

The prior art will be described below in brief.

FIG. 1 is a view illustrating a principle in which the transformer 13, input line 16 and output line 17 are coupled by a distributed capacitance within the transformer in a typical flyback converter to generate a displacement current to the electrical ground. Hereinafter, a black dot shown for each winding of the transformer indicates the start or end of the winding.

Referring to FIG. 1, an AC input voltage is rectified and smoothened by the capacitor 11. The switching element 12 is switched in response to the feedback of the output voltage to create the storage and transferring of energy in the input winding 131 of the transformer 13, and the output rectifier 14 and capacitor 15 rectifies the voltage of the output winding 133 to supply power to a load.

Typically, the varying speed of voltage at the connection point between an end of the input winding 131 of the transformer 13 and the switching element 12 is very fast when the switching element 12 is turned on or off, and the potential variation of maximum 500-600 volts occurs. The potential variation is transferred to the output winding 133 through the path of a distributed capacitance (Cps) between the input winding 131 and the output winding 133 or the path of a distributed capacitance (Cpc) between the input winding 131 and the transformer core and a distributed capacitance (Csc) between the transformer core and the output winding 133, thus allowing the output line 17 to have a noise potential. The potential variation allows the input line 16 to have a noise potential through a distributed capacitance (Cpi) between the input winding 131 and the input line 16. Furthermore, the potential variation allows the transformer core to have a noise potential through a distributed capacitance (Cpc) between the input winding 131 and the transformer core 136. Those noise potentials allow a current to flow through a distributed capacitance (Cig) between the input line 16 and the ground, a distributed capacitance (Cog) between the output line 17 and the ground, and a distributed capacitance (Ccg) between the transformer core and the ground, thereby generating common mode noise, and thus the noise current should be managed to be less than a level specified by the regulations.

FIG. 2 is a principle view for cancelling a capacitive coupling of the output winding by a potential of the input winding in the related art.

Referring to FIG. 2, the input winding 131 generates a capacitive coupling current through a distributed capacitance of the surface facing the output winding 133 by generating an electric field in the direction of facing the output winding 133, and generates a capacitive coupling current through a distributed capacitance between the input winding 131 and the transformer core 136 and a distributed capacitance between the transformer core 136 and the output winding 133 by generating an electric field in the direction opposite to that of facing the output winding 133.

Referring to FIG. 2, a capacitive coupling current between the input winding 131 and the output winding 133 should be maintained low to maintain a displacement current flowing to the electrical ground through the output line. In FIG. 2, to this end, an electric field generated in the direction of facing the output winding 133 from the input winding 131 is shielded by the cancellation winding 132, and an electric field generated in the direction opposite to that of facing the output winding 133 from the input winding 131 is shielded by the shield winding 134.

Furthermore, a capacitive coupling generated in spite of the shielding is removed by the shield winding 134 that forms an electric field using a potential having a polarity opposite to that of the input winding 131. Furthermore, the cancellation winding 132 generates a capacitive coupling having a reversed polarity between the cancellation winding 132 and the output winding 133, thereby cancelling out a capacitive coupling between the input winding 131 and the output winding 133 generated in spite of the shielding.

In order to generate a current having a reverse polarity for cancelling out a capacitive coupling generated from the input winding 131 having a high potential variation to the output winding 133 having a low potential variation with the same polarity, the cancellation winding 132 should have a potential variation lower than that of the output winding 133, and to this end, the number of turns (T: turn) of the cancellation winding 132 is less than that of the output winding 133.

For example, a transformer having a winding width of 8 mm, which is widely used for a mobile phone charger power supply with the input of a commercial voltage of 220 V and the output of 5 V is taken as an example. When the number of turns of the output winding 133 is 8T (T: turn), the number of turns of the cancellation winding 132 is 6T to 7T to cancel out the coupling while shielding the input winding 131 from being capacitively coupled to the output winding 133. In order to completely surround the winding width of 8 mm with 7T, six strands of thin wire having a diameter of 0.18 mm should be uniformly stretched and wound in parallel with no gap, and thus the winding work may be difficult, thereby reducing the productivity and increasing the cost.

FIG. 3 illustrates an example of the transformer of FIG. 2, and FIG. 4 is an example further including three strands of bias winding 135 for pulling out an auxiliary power of about 10 V from the transformer of FIG. 3. Total nine strands should be connected to a common grounding terminal (5a and 7a) to which three strands of bias winding 135 and six strands of cancellation winding 132 should be connected, but such a method cannot be used for a small-sized product in which the height of soldered components is restricted.

FIG. 5 illustrates the structure of a modified transformer for enhancing the productivity of a winding. It has a structure in which the bias winding 135 having a number of turns far greater than that for cancellation is located between the input winding 131 and the output winding 133, and one strand of cancellation winding 137 capacitively coupled to part of the output winding 133 to cancel out a capacitive coupling generated between the input winding 131 and the output winding 133 and between the bias winding 135 and the output winding 133 is added. However, a barrier tape 138 for holding the location of the cancellation winding 137 has a large width deviation, and the physical location of the cancellation winding 137 is varied, and thus a large deviation occurs at a coupling between the cancellation winding 137 and the output winding 133. The deviation has a disadvantage in that EMI is generated to a large extent according to the product.

FIG. 6 is an example having a sandwich winding structure in the related art, in which it is divided into a first input winding 131a having a small potential variation width and a second input winding 131b having a large potential variation width of the input winding to surround both the winding surfaces of the output winding 133 in a sandwich shape. The first shield winding 132a and second shield winding 132b are located between the first input winding 131a and the output winding 133 and between the second input winding 131b and the output winding 133, respectively, to shield a capacitive coupling between the first input winding 131a and the output winding 133 and between the second input winding 131b and the output winding 133. However, even though a capacitive coupling between the second input winding 131b and the output winding 133 having a large potential variation width is shielded, it generates a coupling current far greater than the coupling current occurring between a winding layer having the lowest potential variation width among the winding layers of the input winding 131 in FIG. 3 and the output winding 133. Furthermore, a high spike voltage inherent in the second input winding 131b having a large potential variation width forms another noise on the second shield winding 132b. Accordingly, large conducted noise and radiated noise may be generated, thus requiring measures for noise reduction such as reinforcing line filters, using high frequency filters, and the like.

According to the related art, six strands should be wound in parallel for a wire, and thus the automation is difficult and the productivity is reduced, and soldering a large number of wires to terminals does not satisfy the height restriction in small-sized products, and the shielding deviation is high when shielding with bias windings and balanced windings to reduce the number of strands of wire, thereby deteriorating the EMI margin management. Furthermore, large conducted noise and large radiated noise may be generated in a sandwich winding structure, thus having disadvantages of requiring measures for noise reduction such as reinforcing line filters, using high frequency filters, and the like. The present invention is contrived to solve all the foregoing disadvantages in the related art.

SUMMARY OF THE INVENTION

The present invention may be applicable to non-insulation type buck converters, buck-boost converters and boost converters, and insulation type forward converter and flyback converter, but the description according to the embodiments will be mainly described with respect to the flyback converter.

In order to accomplish the foregoing object, there is provided a magnetic energy-transfer element used for a switching type power supply comprising a first voltage input terminal, a second voltage input terminal, a switching element, a magnetic energy-transfer element, an output rectifier, and an output line, and the magnetic energy-transfer element may include a core of the magnetic energy-to transfer element; an input winding wound around the core of the magnetic energy-transfer element, wherein the flow of current and the transfer of magnetic energy are switched by the switching operation of the switching element; an output winding wound to face one side surface of the input winding and magnetically coupled to the input winding to take out energy and supply it to the load, wherein the polarity of the potential variation of a terminal connected to the output rectifier is opposite to that of the potential variation at a connecting point between an end of the input winding and an end of the switching element; and a cancellation winding configured to shield a capacitive coupling through the distributed capacitance of a surface facing each other between the input winding and the output winding, and to generate a capacitive coupling to the output winding so as to cancel out and reduce the sum of capacitive couplings generated from windings other than the output winding and the core of the magnetic energy-transfer element to the output winding, wherein the number of turns of the cancellation winding wound per unit area of one winding layer for reducing the sum of capacitive couplings generated to the output winding is greater than that of the output winding wound per unit area of one winding layer.

Furthermore, in order to accomplish the foregoing object, there is provided a magnetic energy-transfer element used for a switching type power supply comprising a first voltage input terminal, a second voltage input terminal, a switching element, a magnetic energy-transfer element, an output rectifier, and an output line, and the magnetic energy-transfer element may include a core of the magnetic energy-transfer element; a first input winding wound around the core of the magnetic energy-transfer element, and connected between the first voltage input terminal and one side terminal of the switching element, wherein the flow of current and the transfer of magnetic energy are switched by the switching operation of the switching element; and a second input winding wound around the core of the magnetic energy-transfer element, and connected between the second voltage input terminal and the other side terminal of the switching element, wherein the flow of current and the transfer of magnetic energy are switched by is the switching operation of the switching element, wherein an effect exerted to the outside due to a potential variation and generated noise of the first input winding by the switching operation of the switching element and an effect exerted to the outside due to a potential variation and generated noise of the second input winding by the switching operation of the switching element are cancelled out due to their opposite polarities.

Furthermore, in order to accomplish the foregoing object, there is provided a magnetic energy-transfer element used for a switching type power supply comprising a first voltage input terminal, a second voltage input terminal, a switching element, a magnetic energy-transfer element, an output rectifier, and an output line, and the magnetic energy-transfer element may include a core of the magnetic energy-transfer element; a first input winding wound around the core of the magnetic energy-transfer element, and connected between the first voltage input terminal and one side terminal of the switching element, wherein the flow of current and the transfer of magnetic energy are switched by the switching operation of the switching element; a second input winding wound around the core of the magnetic energy-transfer element, and connected between the second voltage input terminal and the other side terminal of the switching element, wherein the flow of current and the transfer of magnetic energy are switched by the switching operation of the switching element; and an output winding magnetically coupled to the first input winding and the second input winding to take out energy, wherein an effect exerted to the outside due to a potential variation and generated noise of the first input winding by the switching operation of the switching element and an effect exerted to the outside due to a potential variation and generated noise of the second input winding by the switching operation of the switching element are cancelled out each other due to their opposite polarities.

Furthermore, there are provided a buck converter, a buck-booster converter, a boost converter, a flyback converter, and a forward converter including the foregoing magnetic energy-transfer element according to the present invention.

Furthermore, there is provided a manufactured article including the foregoing power supply according to the present invention.

Hereinafter, a transformer and a power supply having a structure of cancelling out noise according to the present invention will be described in detail with reference to the accompanying drawings.

According to the present invention, a capacitive coupling between the input winding and the output winding of a transformer may be cancelled out, thereby the number of turns of the cancellation winding for reducing noise potential of the output line is further increased, a winding operation with a further smaller number of strands of wire is allowed, facilitating the automation of the winding operation due to simplified winding structure of the transformer, enhancing the productivity, reducing the cost of the transformer, enhancing the deviation of EMI due to a small deviation of cancellation, and easily coping with the height restriction of a soldering portion on a terminal for small-sized products having a component height restriction.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

[First Embodiment]

Figure 7:
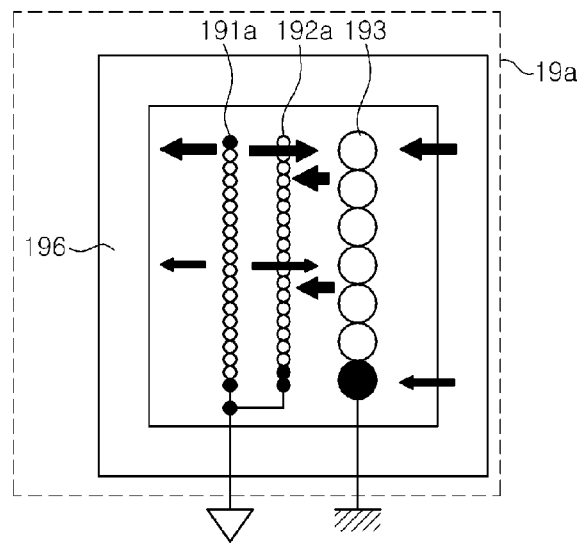
FIG. 7 is a diagram illustrating Principle 1 of cancellation of capacitive coupling of a transformer according to the present invention.

FIG. 7 is Principle 1 which is an embodiment of a transformer 19a for shielding and cancelling out a capacitive coupling between the input winding and the output winding having a single directional potential variation.

According to Principle 7 of FIG. 7, the transformer 19a is configured with an input winding 191a, an output winding 193, and a cancellation winding 192a wound around the winding section of a transformer core 196.

Figure 8:
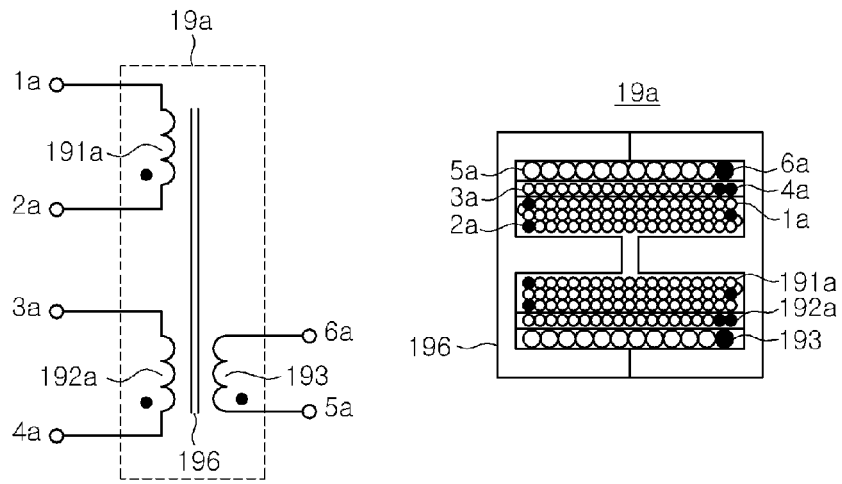
FIG. 8 is an embodiment illustrating a transformer configured according to Principle 1 in FIG. 7.
Figure 9:
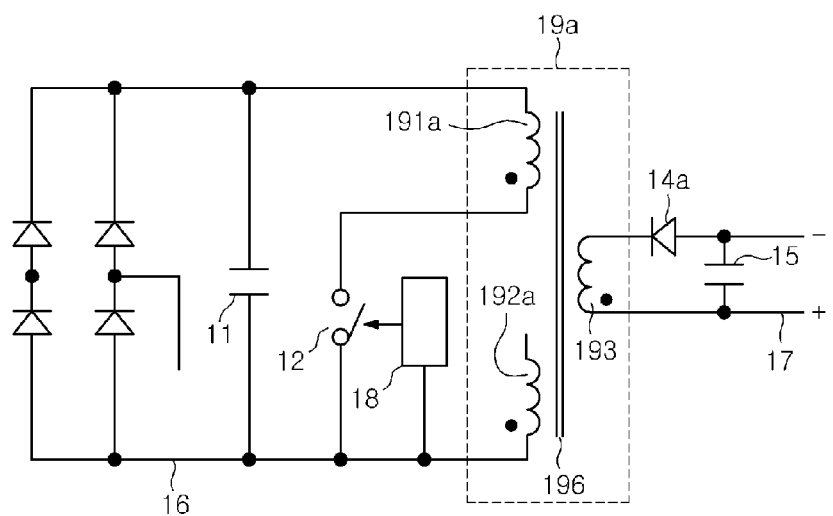
FIG. 9 is a configuration diagram illustrating a flyback converter to which the transformer of FIG. 8 is applied.

FIG. 8 is an embodiment illustrating the transformer 19a configured according to Principle 1 in FIG. 7, and FIG. 9 is a configuration diagram illustrating a flyback converter to which the transformer 19a of FIG. 8 is applied.

The input winding 191a of FIG. 7 has a potential variation due to a current flow interruption by the switching operation of the switching element 12 illustrated in FIG. 9, and the potential variation of a terminal connected to the output rectifier among the terminals of the output winding 193 has an opposite polarity to that of the input winding 191a.

At every instant when the potential of the input winding 191a varies according to the switching operation of the switching element 12, the output winding 193 is capacitively coupled due to electric fields variation caused by the potential variation of the input winding 191a.

In the transformer 19a of FIG. 7, a capacitive coupling due to a potential variation between the input winding 191a and the output winding 193 may be divided into a coupling due to an electric field generated in the direction of the input winding 191a facing the output winding 193 and a coupling due to an electric field generated in the opposite direction to the direction of the input winding 191a facing the output winding 193. The transformer core 196 is capacitively coupled by an electric field generated in the opposite direction to the direction of the input winding 191a facing the output winding 193, and the core 196 is capacitively coupled to the output winding 193 again through the magnetic path of the core.

In order to cancel out and remove the sum of capacitive couplings generated from windings other than the cancellation winding 192a and the transformer core 196 to the output winding 193, the cancellation winding 192a allows a potential difference between the cancellation winding 192a and the output winding 193 to generate a capacitive coupling.

In other words, the cancellation winding 192a allows the size of a capacitive coupling generated from the cancellation winding 192a to the output winding 193 due to a potential difference from the output winding 193 to be equal to the sum of capacitive couplings with the opposite polarity generated from windings other than the cancellation winding 192a and the transformer core 196 to the output winding 193, thus cancelling out and removing all capacitive couplings generated to the output winding 193.

The cancellation winding 192a should have a potential variation with the opposite polarity greater than that of the output winding 193 to generate a capacitive coupling with the opposite polarity to the capacitive coupling by a potential difference between the output winding 193 having a potential variation with the opposite polarity to that of the potential variation of the input winding 191a and the input winding 191a. Accordingly, the number of turns of the cancellation winding 192a for cancellation is greater than that of the output winding 193.

Furthermore, the cancellation winding 192a is wound to fill one winding layer between the input winding 191a and the output winding 193 with no gap to shield a capacitive coupling due to an electric field generated in the direction of the input winding 191a facing the output winding 193, thus generating a very small capacitive coupling. The cancellation winding 192a is wound to fill one winding layer between the input winding 191a and the output winding 193 with no gap for shielding.

When an electric field generated in the opposite direction to the direction of the input winding 191a facing the output winding 193 is not capacitively coupled at all to the output winding 193, the number of turns of the cancellation winding 192a is set to be greater than that of the output winding 193 by 1T-2T to cancel out a small amount of capacitive coupling due to an electric field generated in the direction of the input winding 191a facing the output winding 193 and shielded.

However, according to the present invention, an amount of capacitive coupling due to an electric field generated in the opposite direction to the direction of the input winding 191a facing the output winding 193 is set to be greater than that of an electric field generated in the direction of the input winding 191a facing the output winding 193 and shielded, and thus the number of turns of the cancellation winding 192a required for cancellation is adjusted to the number of turns with good productivity.

As increasing the amount of capacitive coupling due to an electric field generated in the opposite direction to the direction of the input winding 191a facing the output winding 193, a difference between the number of turns of the cancellation winding 192a for cancellation and the number of turns of the output winding 193 may be further increased, but if the difference is too large, then conducted noise will increase.

The transformer 19a, which is an embodiment of the present invention according to Principle 1 in FIG. 7, will be described below.

In the transformer 19a of FIG. 8, the input winding 191a, the cancellation winding 192a and the output winding 193 are sequentially wound around the transformer core 196. A winding layer closest to the output winding 193 among the winding layers of the input winding 191a is a winding layer having the lowest potential variation among the winding layers of the input winding 191a. The strength of an electric field generated in the direction of the input winding 191a facing the output winding 193 is mainly influenced by the potential of a winding layer having the lowest potential variation among the winding layers of the input winding 191a. A winding layer located at an opposite end in the direction of the input winding 191a facing the output winding 193 among the winding layers of the input winding 191a is a winding layer having the highest potential variation among the winding layers of the input winding 191a. The strength of an electric field generated in the opposite direction to the direction of the input winding 191a facing the output winding 193 is mainly influenced by the potential of a winding layer having the highest potential variation among the winding layers of the input winding 191a.

FIG. 9 is an example of a flyback converter to which the transformer 19a is applied.

Figure 1:
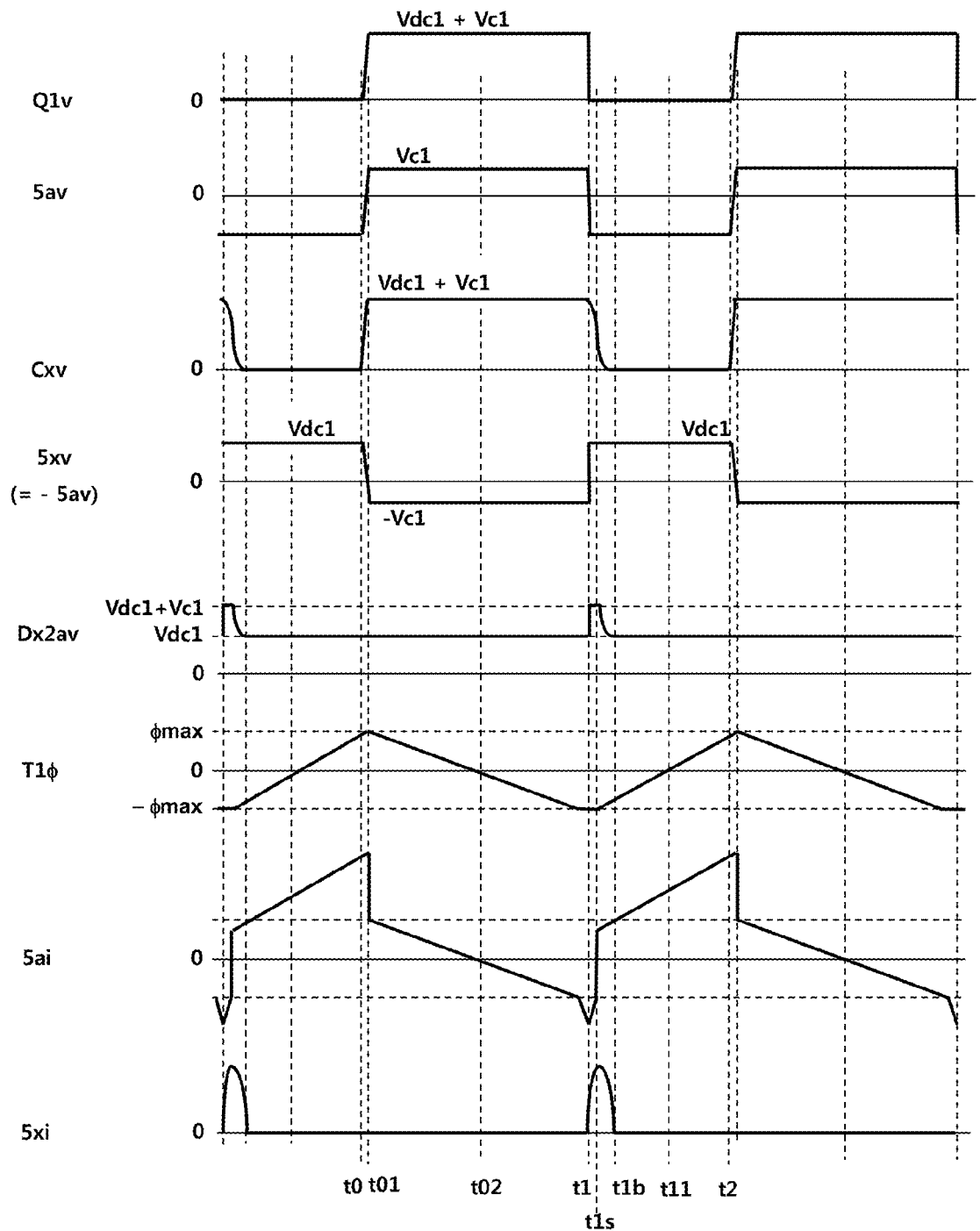
FIG. 1 is a generation diagram illustrating a displacement current flowing to the ground by a distributed capacitance within a transformer in a flyback converter according to the related art.
Figure 2:
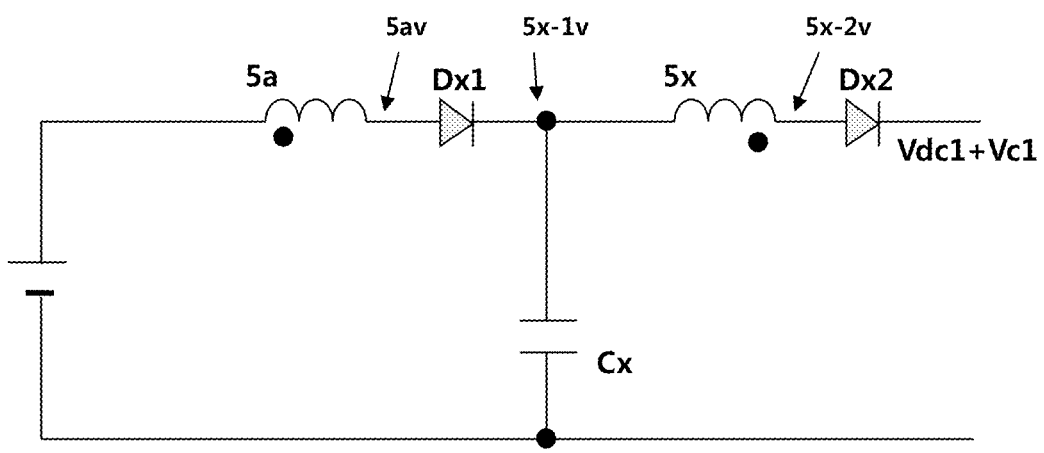
FIG. 2 is a principle diagram of cancellation in the related art.
Figure 3:
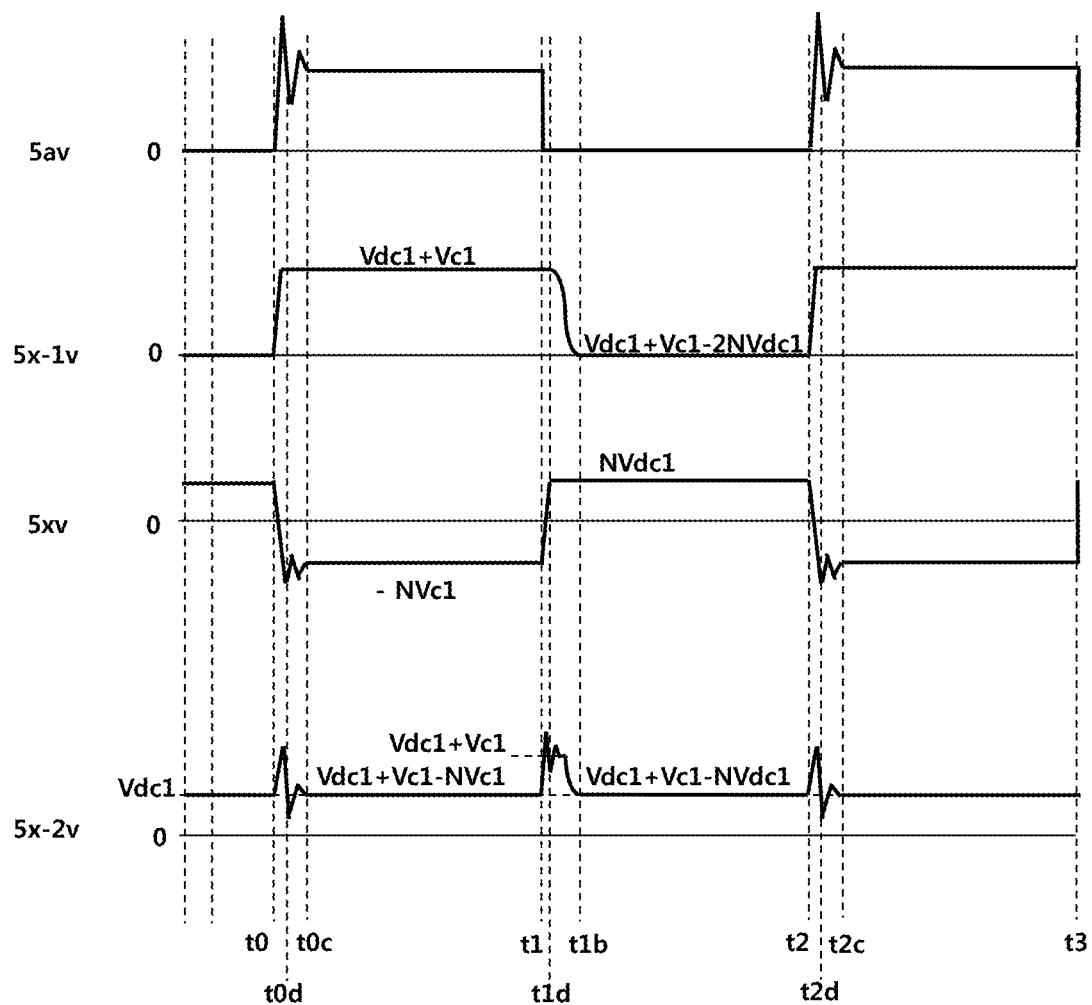
FIGS. 3 through 5 are embodiments illustrating the structure of a transformer in the related art.
Figure 4:
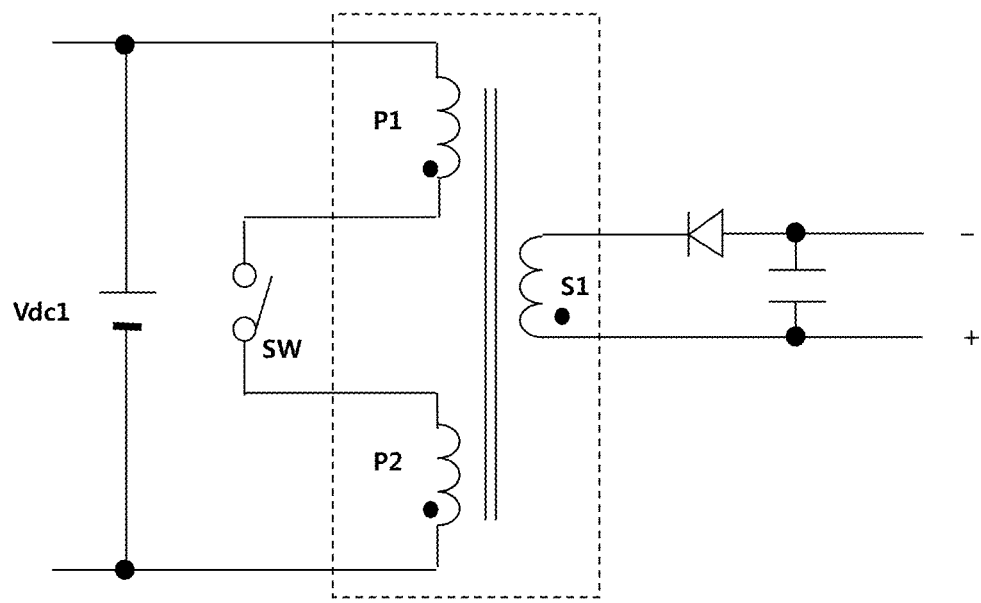
Figure 5:
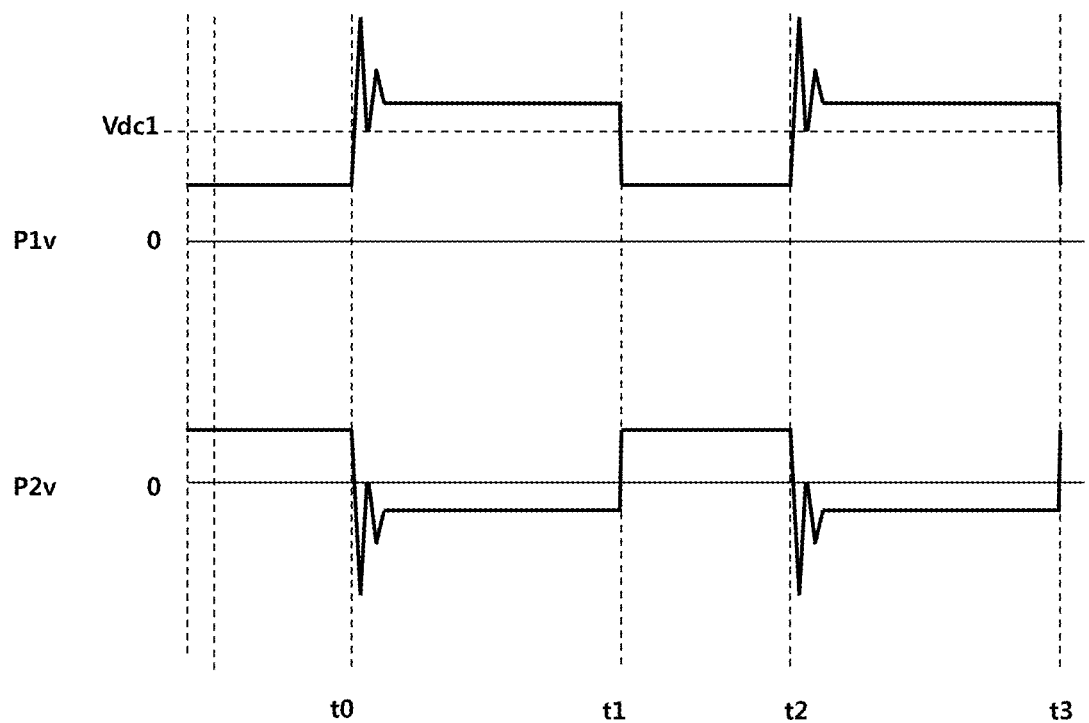

In FIG. 9, the capacitor 11, switching element 12, input line 16 and output line 17 correspond to the elements in FIG. 1, respectively.

The output rectifier 14a of FIG. 9 rectifies a negative voltage since the output winding 193 of the transformer 19a has a potential variation with the opposite polarity to that of the input winding 191a, and the polarities of the voltage of the capacitor 15 and the output voltage are opposite to those of FIG. 1.

The present invention described above with reference to FIGS. 7 through 9 will be summarized again below.

The transformer 19a of the present invention according to Principle 1 in FIG. 7 may include a core 196 of the magnetic energy-transfer element; an input winding 191a wound around the core 196 of the magnetic energy-transfer element, wherein the flow of current and the transfer of magnetic energy are switched by the switching operation of the switching element 12; an output winding 193 wound to face one side surface of the input winding 191a and magnetically coupled to the input winding 191a to take out energy and supply it to the load, wherein the polarity of the potential variation of a terminal connected to the output rectifier 14a is opposite to that of the potential variation at a connecting point between an end of the input winding 191a and an end of the switching element 12; and a cancellation winding 192a located between the input winding 191a and the output winding 193 to shield a capacitive coupling through the distributed capacitance of a surface facing each other between the input winding 191a and the output winding 193, and to generate a capacitive coupling to the output winding 193 so as to cancel out and reduce the sum of capacitive couplings generated from windings other than the output winding 193 and the core 196 of the magnetic energy-transfer element to the output winding 193, wherein the number of turns of the cancellation winding 192a wound per unit area of one winding layer for reducing the sum of capacitive couplings generated to the output winding 193 is greater than that of the output winding 193 wound per unit area of one winding layer.

Furthermore, in the transformer 19a of the present invention according to Principle 1 in FIG. 7, an electric field generated from a winding surface of the winding located at an opposite end in the direction of the input winding 191a facing the output winding 193 in opposite direction to the direction of the input winding 191a facing the output winding 193 is capacitively coupled to the output winding 193 through the core 196 of the magnetic energy-transfer element.

Furthermore, in the transformer 19a of the present invention according to Principle 1 in FIG. 7, as increasing an amount of capacitive coupling generated to the output winding 193 by an electric field formed in the opposition direction to the direction of the input winding 191a facing the output winding 193 from the winding surface of a winding layer located at an opposite end of the direction facing the output winding 193 among the winding layers of the input winding 191a, the number of turns of the cancellation winding 192a wound per unit area of one winding layer is further greater than that of the output winding 193 wound per unit area of one winding layer.

Figure 10:
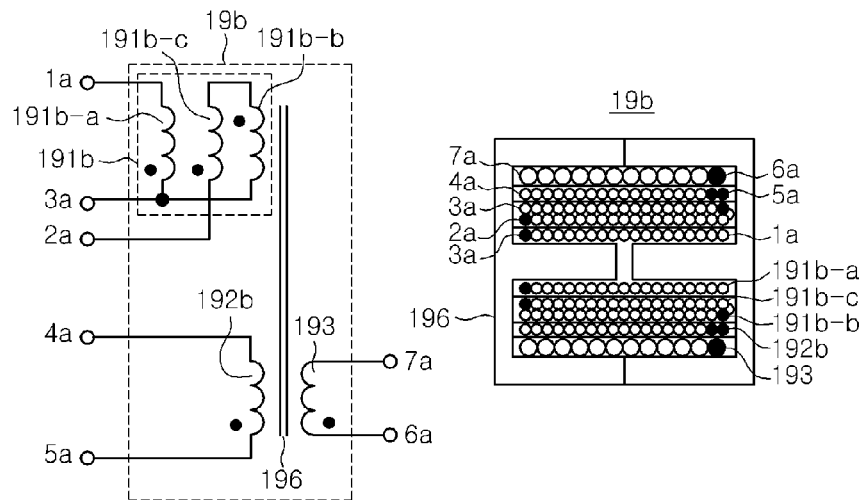
FIG. 10 is another embodiment illustrating a transformer configured according to Principle 1 in FIG. 7.

FIG. 10 illustrates the transformer 19b which is another embodiment of the present invention according to Principle 1 in FIG. 7.

In the transformer 19a of FIG. 8 as described above, a layer having the highest potential variation among the winding layers of the input winding 191a is located at an end in the opposite direction to the direction facing the output winding 193 and generates an electric field in the opposite direction to the direction facing the output winding 193. When an AC 220V input is rectified and used, the potential variation width of a layer having the highest potential variation is too high, approximately 500V, and thus an electric field generated in the opposite direction to the direction facing the output winding 193 may be too large, and a coupling to the output winding 193 may be excessively generated. On the contrary, when a layer having a high potential variation among the winding layers of the input winding 191a is closest to the output winding 193 and a layer having the lowest potential variation is located at an end in the opposite direction to the direction facing the output winding 193, ringing at a high spike voltage contained in the input winding 191a may be transferred to the cancellation winding 192a through a distributed capacitance, thus causing a problem of generating a cancellation error.

FIG. 10 is to reduce the problem of the transformer 19a of FIG. 8 as described above.

The transformer 19b locates a winding layer 191b-c having the highest potential variation among the winding layers of the input winding 191b between a winding layer 191b-a having the lowest potential variation and a winding layer 191b-b having a middle potential variation. The structure may prevent ringing at a high spike voltage contained in the input winding 191a of the transformer 19a in FIG. 8 from affecting on other windings through a distributed capacitance. In the transformer 19b, the winding layer 191b-a having the lowest potential variation among the winding layers of the input winding 191b is located at an end in the opposite direction to the direction facing the output winding 193 to adjust the strength of an electric field generated in the opposite direction to the direction facing the output winding 193.

When the number of turns is set by differently configuring the thickness or number of strands of wire of the winding layer 191b-a located at an end in the opposite direction to the direction facing the output winding 193 from other winding layers 191b-b or 191b-c, the strength of an electric field generated in the opposite direction to the direction facing the output winding 193 by the potential of the winding layer 191b-a may be set differently, thereby allowing the number of turns of the cancellation winding 192b required for cancellation to be set to desired value.

For the transformer 19b of FIG. 10, the location arrangement of each winding layer 191b-a to 191b-c in the input winding 191b may vary according to the potential variation width of the input winding 191b.

In other words, when the potential variation width of the input winding 191b is low, the winding layer 191b-c having the highest potential variation among the winding layers of the input winding 191b may be located at an end in the opposite direction to the direction facing the output winding 193. When the potential variation width of the input winding 191b is greater than that value, the winding layer 191b-b having a middle potential variation among the winding layers of the input winding 191b may be located at an end in the opposite direction to the direction facing the output winding 193, and the winding layer 191b-a having the lowest potential variation may be located when it is very high.

Figure 11:
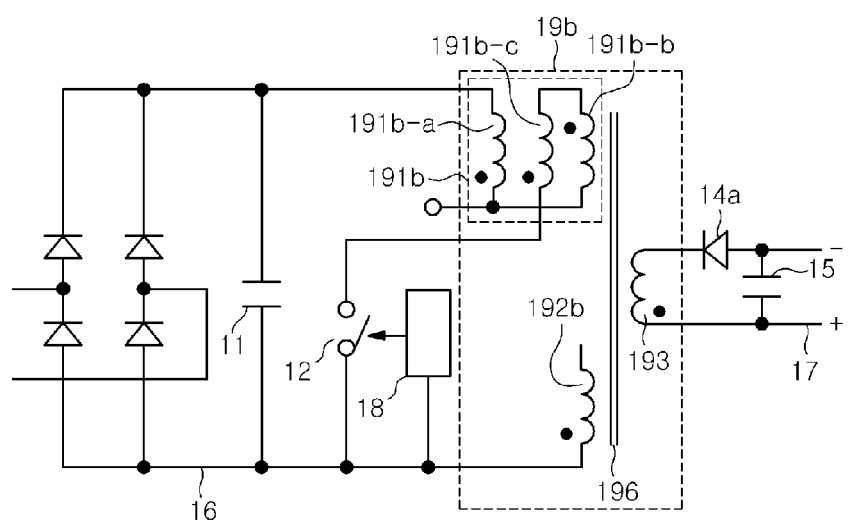
FIG. 11 is a configuration diagram illustrating a flyback converter to which the transformer of FIG. 10 is applied.

FIG. 11 is a configuration diagram illustrating a flyback transformer to which the transformer 19b is applied, and the elements other than the transformer 19b correspond to those of FIG. 9.

The present invention described above with reference to FIGS. 10 and 11 will be summarized again below.

In the transformer 19b of the present invention according to Principle 1 in FIG. 7, the location arrangement of the winding layer 191*b-a* having the lowest potential variation, the winding layer 191*b-c* having the highest potential variation and winding layer 191*b-b* having a middle potential variation is selected from the winding layers of the input winding 191*b* to set the number of turns of the cancellation winding 192*b* wound per unit area of one winding layer to set the amount of capacitive coupling to the output winding 193 to a target value.

In the transformer 19*b* of the present invention according to Principle 1 in FIG. 7, the winding layer 191*b-c* having the highest potential variation among the winding layers of the input winding 191*b* may be located between the winding layer 191*b-a* having the lowest potential variation and the remaining layer 191*b-b* of the input winding.

In the transformer 19*b* of the present invention according to Principle 1 in FIG. 7, the number of turns of a winding layer located at an end in the opposite direction to the direction facing the output winding 193 among the winding layers of the input winding 191*b* may be selected to be different from the number of turns of other winding layer of the input winding (191*a* or 191*b-a* to 191*b-c*) to set the number of turns of the cancellation winding 192*b* wound per unit area of one winding layer to a target value.

Figure 12:
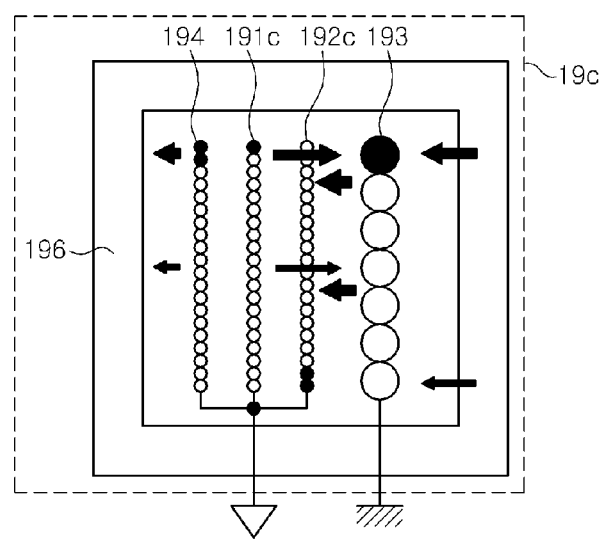
FIG. 12 is a diagram illustrating Principle 2 of cancellation of capacitive coupling of a transformer according to the present invention.

Principle 2 in FIG. 12 proposes a method of setting the strength of an electric field formed in the opposite direction to the direction facing the output winding 193 regardless of the potential variation width of the 191*c*.

The input winding 191*c* and output winding 193 in FIG. 12 correspond to the input winding 191*a* and output winding 193 in FIG. 7.

In FIG. 12, the core bias winding 194 having a potential variation with the same polarity as the potential variation of the input winding 191*c* shields a capacitive coupling between a layer having a high potential variation of the input winding 191*c* and the core 196 of the transformer 19*c* as well as forms an electric field in the opposite direction to the direction facing the output winding 193 due to a potential contained in the input winding 191*c* and the core bias winding 194 to capacitively couple the transformer core 196 and capacitively couple the output winding 193 through a magnetic path of the core.

The cancellation winding 192*c* fills one winding layer between the input winding 191*c* and the output winding 193 with no gap to shield a capacitive coupling due to an electric field generated in the direction of the input winding 191*c* facing the output winding 193, and cancels out and removes a minute coupling current generated in spite of shielding and a coupling current due to an electric field generated in the direction of the input winding 191*c* and the core bias winding 194 facing the output winding 193 with a capacitive coupling current generated between the cancellation winding 192*a* and the output winding 193.

Accordingly, when the number of turns of the core bias winding 194 is selected in an appropriate manner, the number of turns of the cancellation winding 192*c* required for cancellation can be set to a value suitable to the productivity.

Figure 13:
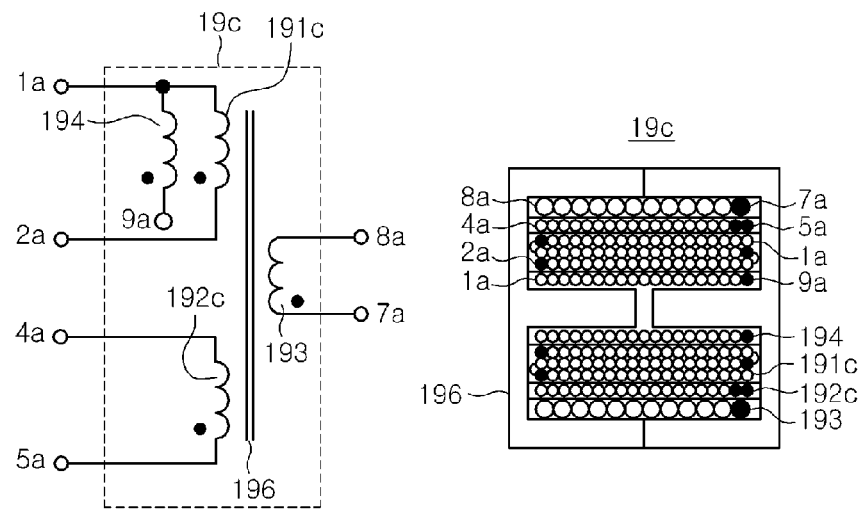
FIG. 13 is an embodiment illustrating a transformer configured according to Principle 2 in FIG. 12.

FIG. 13 is an embodiment illustrating a transformer configured according to Principle 2 in FIG. 12.

In the transformer 19*c* of FIG. 13, a winding layer having the lowest potential variation among the winding layers of the input winding 191*c* is wound closest to the output winding 193, and a winding layer having the highest potential variation is located farthest from the output winding 193. The other description thereof is the same as the description of FIG. 12.

Figure 14:
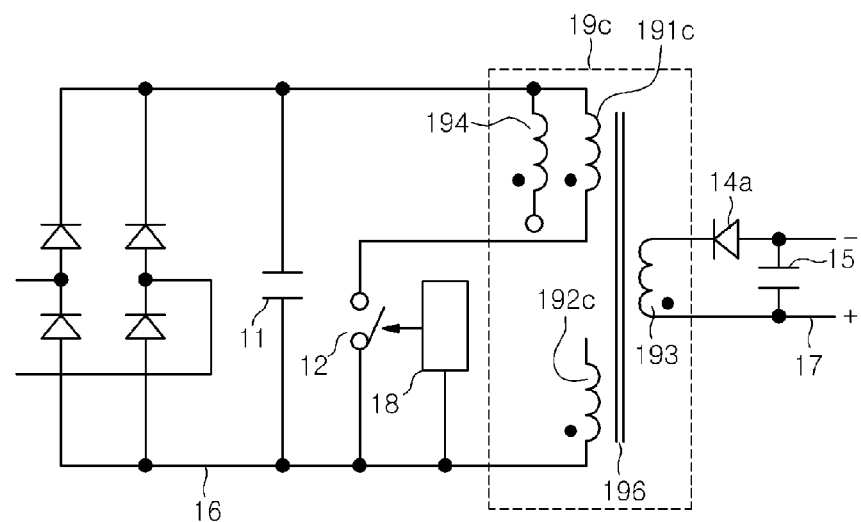
FIG. 14 is a configuration diagram illustrating a flyback converter to which the transformer of FIG. 13 is applied.

FIG. 14 is a configuration diagram illustrating a flyback converter to which the transformer 19*c* is applied, and the elements other than the transformer 19*c* correspond to those of FIG. 9.

The present invention described above with reference to FIGS. 12 through 14 will be summarized again below.

The transformer 19*c* of the present invention according to Principle 2 in FIG. 12 may further include a core bias winding 194 wound between a winding layer located farthest from the output winding 193 among the winding layers of the input winding 191*c* and the core 196 of the transformer to have the same polarity of potential variation as that of potential variation at a connecting point between an end of the input winding 191*c* and an end of the switching element 12, wherein an amount of capacitive coupling generated to the output winding 193 by an electric field formed in the opposition direction to the direction facing the output winding 193 from the winding surface of a winding layer located at an opposite end in the direction of the input winding 191*c* facing the output winding 193 is set by the number of turns of the core bias winding 194.

Figure 15:
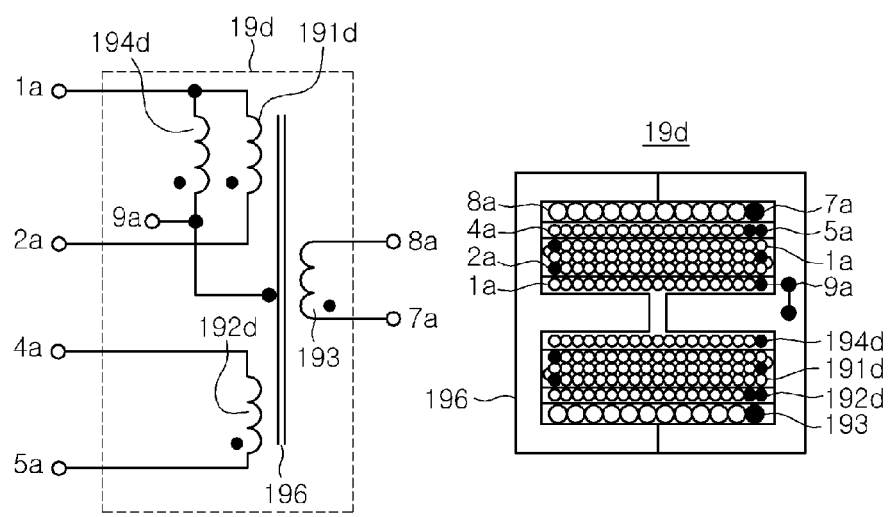
FIG. 15 is another embodiment illustrating a transformer configured according to Principle 2 in FIG. 12.

FIG. 15 is a modification of Principle 2 in FIG. 12.

The transformer 19*c* of FIG. 12 generates an electric field in the opposite direction to the direction facing the output winding 193 by the core bias winding 194. On the contrary, the transformer 19*d* of FIG. 15 allows a terminal end of the core bias winding 194*d* to be directly connected to the transformer core 196, thereby allowing the transformer core 196 to generate an electric field by a potential of the core bias winding 194. The input winding 191*d*, output winding 193, and cancellation winding 192*d* in FIG. 15 correspond to the input winding 191*c*, output winding 193, and cancellation winding 192*c* in FIG. 12, respectively.

The cancellation winding 192*d* of FIG. 15 shields a capacitive coupling due to an electric field generated in the direction of the input winding 191*d* facing the output winding 193, and cancels out and removes a minute coupling current generated in spite of shielding and a coupling current due to an electric field generated from the transformer core 196 with a capacitive coupling current due to a potential difference between the cancellation winding 192*d* and the output winding 193.

Accordingly, the number of turns of the cancellation winding 192*d* required for cancellation can be set to its desired value by appropriately selecting the number of turns of the core bias winding 194*d*.

Figure 16:
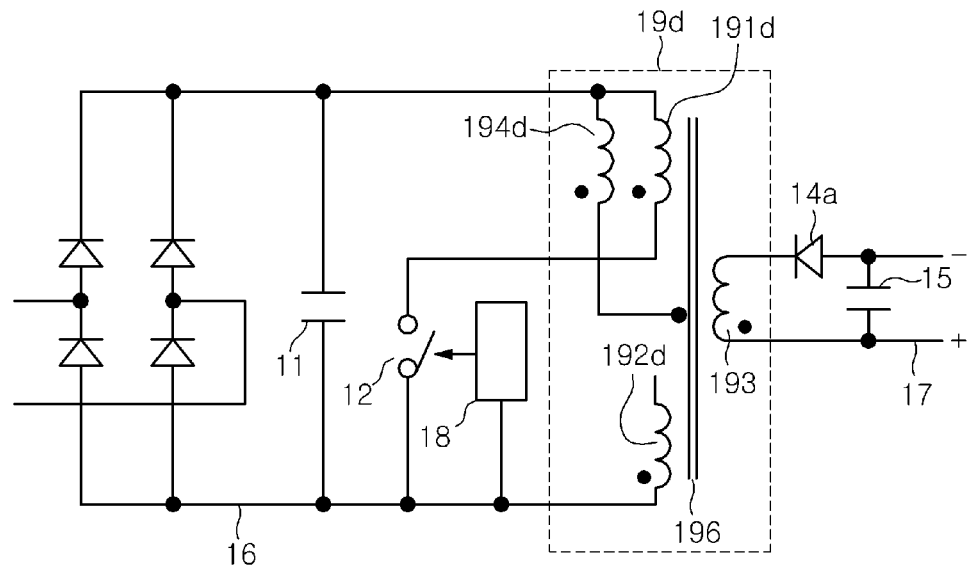
FIG. 16 is a configuration diagram illustrating a flyback converter to which the transformer of FIG. 15 is applied.

FIG. 16 is a configuration diagram illustrating a flyback converter to which the transformer 19*d* of FIG. 15 is applied, and the elements other than the transformer 19*c* correspond to those of FIG. 9.

The present invention described above with reference to FIGS. 15 and 16 will be summarized again below.

The transformer 19*d* of the present invention according to Principle 2 in FIG. 12 may further include a core bias winding 194*d* wound between a winding layer located farthest from the output winding 193 among the winding layers of the input winding 191*d* and the transformer core 196, in which one side terminal with the same polarity of potential variation as that of potential variation at a connecting point between an end of the input winding 191*d* and an end of the switching element 12 is connected to the transformer core 196, wherein an amount of capacitive coupling generated to the output winding 193 by an electric field formed from the transformer core 196 is set by the number of turns of the core bias winding 194*d*.

As described above, the present invention may set an amount of capacitive coupling to the output winding 193 through the transformer core 196 and the like by an electric field generated in the opposite direction to the direction facing the output winding 193, thereby allowing the number of turns of the cancellation winding 192a to 192d for reducing a displacement current flowing to the electrical ground from the power supply to be set to the number of turns for good productivity and suitable to take out auxiliary power.

Furthermore, the cancellation winding 192a to 192d of the transformer 19a to 19d according to the present invention may facilitate the winding work to enhance the productivity, and the physical location variation of the cancellation winding 192a to 192d filled in one winding layer with no gap by a large number of turns may be small to generate a low deviation of capacitive coupling to the output winding, and as a result, a deviation of the cancellation characteristics may be generated to a small extent, thereby stabilizing the deviation of conducted EMI to a large extent even during mass production, and having an effect on cost reduction due to low unit production cost.

[Second Embodiment]

In the transformer 13a in the related art and the transformer 19a to 19d in FIGS. 8 through 16, the cancellation winding 132 or 192a to 192d deteriorates a magnetic coupling between the input winding 131 or 191a to 191d and the output winding 133 or 193 to increase a leakage inductance and deteriorate the efficiency. Furthermore, the cancellation winding 132 or 192a to 192d cancels out a capacitive coupling between the input winding 131 or 191a to 191d and the output winding 133 or 193 using an induced voltage, wherein the induced voltage may have a delayed distorted waveform compared to a voltage waveform of the input winding 131 or 191a to 191d and thus the cancellation effect may vary for each frequency bandwidth due to an error of cancellation.

Figure 17:
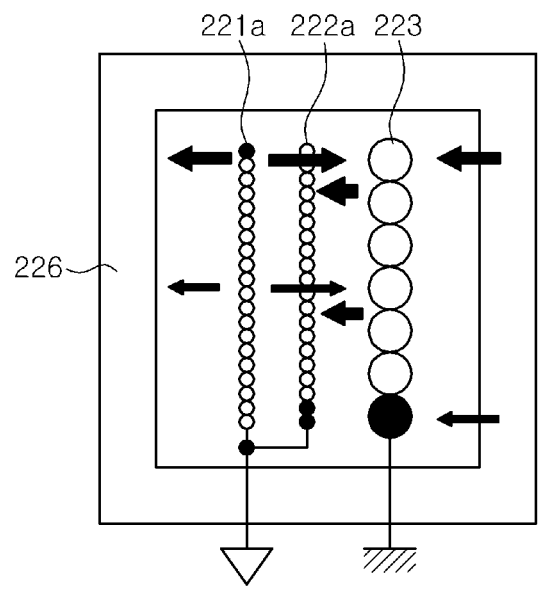
FIG. 17 is a diagram illustrating Principle 3 of cancellation of capacitive coupling of a transformer according to the present invention.

FIG. 17 illustrates Principle 3 proposing a solution of increasing a magnetic coupling between the input winding and the output winding and reducing a leakage inductance to enhance the efficiency, and reducing an error of cancellation to provide an excellent cancellation effect.

Referring to FIG. 17, the transformer core 226, first input winding 221a, and output winding 223 correspond to the transformer core 196, input winding 191a, and output winding 193 in FIG. 7, and the cancellation winding 192a in FIG. 7 is replaced with the second input winding 222a.

Similarly to the description of FIG. 7, a capacitive coupling between the first input winding 221a and the output winding 223 is made of a coupling due to an electric field generated in the direction of the first input winding 221a facing the output winding 223 and a coupling due to an electric field generated in the opposite direction to the direction of the first input winding 221a facing the output winding 223 as illustrated in FIG. 17. The second input winding 222a is wound to fill one winding layer between the input winding 221a and the output winding 223 with no gap to shield a capacitive coupling due to an electric field generated in the direction of the input winding 221a facing the output winding 223.

A minute coupling current generated through a surface facing each other between the first input winding 221a and the output winding 223 in spite of shielding and a coupling current through the transformer core 226 due to an electric field generated in the opposite direction to the direction of the input winding 221a facing the output winding 223 are cancelled out and reduced with a capacitive coupling current between the second input winding 222a and the output winding 223. Furthermore, similarly to the description of the cancellation winding 192a in FIG. 7, the number of turns of the second input winding 222a required for cancellation is greater than that of the output winding 223.

Figure 18:
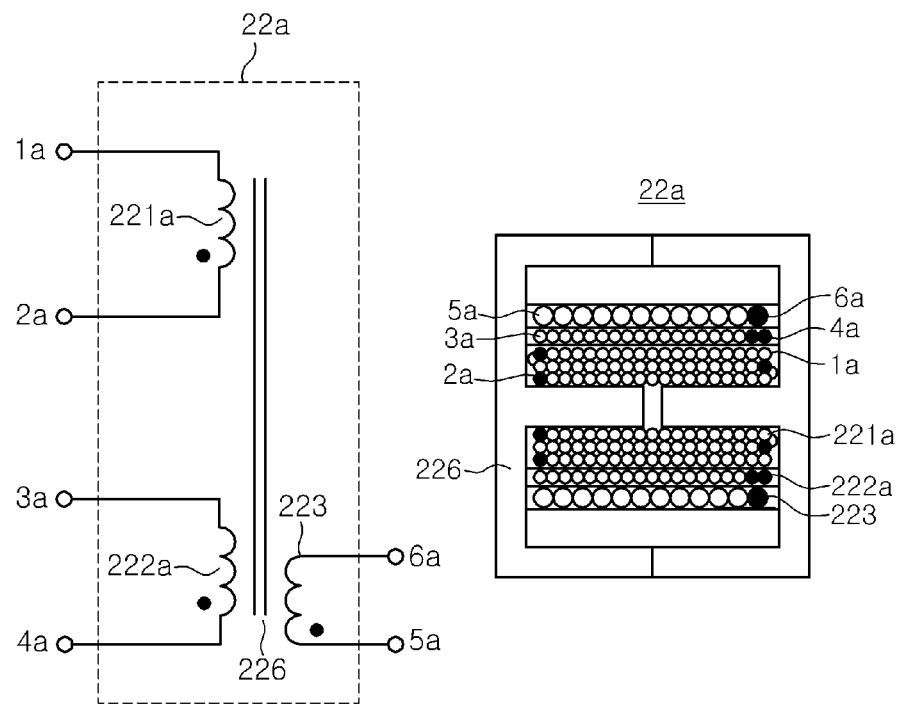
FIG. 18 is an embodiment illustrating a transformer configured according to Principle 3 in FIG. 17.
Figure 19:
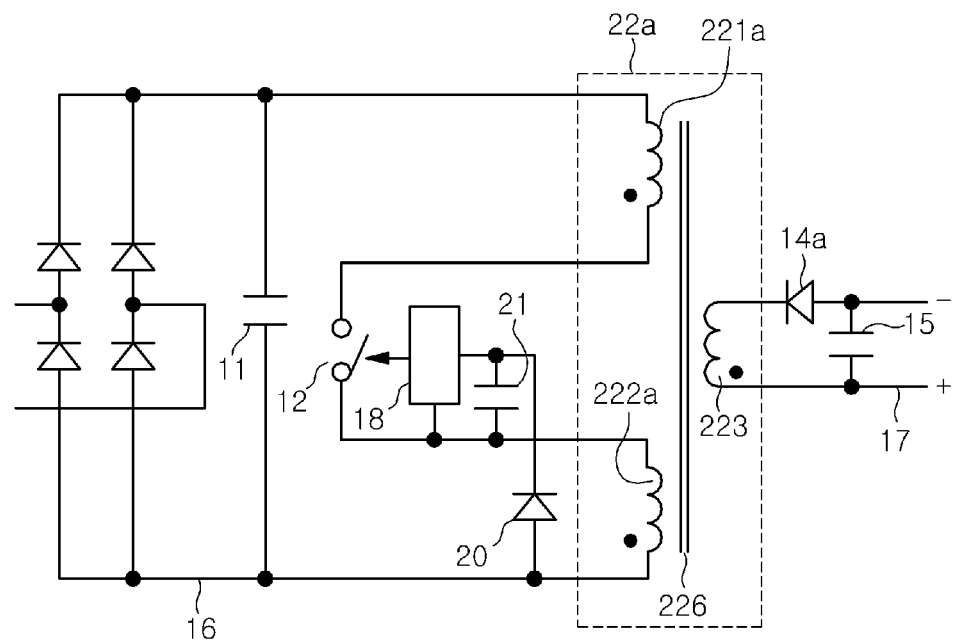
FIG. 19 is a configuration diagram illustrating a flyback converter to which the transformer of FIG. 18 is applied.

FIG. 18 illustrates a transformer 22a to which Principle 3 in FIG. 17 is applied, and FIG. 19 is a flyback converter to which the transformer 22a of FIG. 18 is applied, and FIGS. 18 and 19 will be described below.

The input winding wound around the transformer core 226 of the transformer 22a is divided into the first input winding 221a and the second input winding 222a. As illustrated in FIG. 19, the first input winding 221a connected between a "+" input voltage and the switching element 12 and the second input winding 222a connected between a "−" input voltage and the switching element 12 transfer magnetic energy with potential variation in opposite polarities to each other due to switching of the switching element 12 by the control of the driving circuit 18 to, and the output voltage of the output winding 223 is rectified and smoothened by the output rectifier 14a and capacitor 15 to supply energy to the load. As a portion of the input winding, the second input winding 222a transfers energy, thereby having an advantage in that the level of coupling to the output winding 223 is high to have a low leakage inductance, and the energy transfer efficiency is higher than the transformer 13a in the related art and the transformer 19a to 19d in the related art in FIGS. 8 through 16.

A potential variation or high frequency noise generated from the first input winding 221a has an opposite polarity to that of the potential variation or high frequency noise generated from the second input winding 222a, and a amount transferred from the two windings to other elements and lines within the power supply is cancelled out and thus only the difference of amount remains. Consequently, if the variations of an electric field or the sizes of high frequency noise from the two windings are the same, then the value of noise transferred to other elements or lines within the power supply is cancelled out to become very low.

The first input winding 221a and second input winding 222a have the same current change according to the switching operation of the switching element 12, and the two windings generate symmetrical waveforms with opposite polarities at the same instant. Accordingly, the voltage of the second input winding 222a has a much more similar waveform to the voltage waveform of the first input winding 221a compared to the cancellation winding 192a using an induced voltage in FIG. 7, and thus more accurate cancellation operation is enabled, thereby having an excellent cancellation effect over a broad frequency bandwidth.

Referring to FIG. 18, similarly to the description of FIG. 7, in order to allow the number of turns of the second input winding 222a required for cancellation to be greater than that of the output winding 223, the voltage of a terminal of the output winding 223 connected to the output rectifier 14a is configured to have an opposite polarity to the potential variation of the first input winding 221a. Accordingly, as illustrated in FIG. 19, the output voltage rectified through the output rectifier 14a and smoothened by the capacitor 15 is a "−" voltage.

Referring to FIG. 18, the second input winding 222a cancels out and removes the sum of capacitively couplings to the output winding 223 from windings other than the second input winding 222a and the transformer core 226 with a capacitive coupling generated between the second input winding 222a and the output winding 223, thereby reducing a displacement current flowing to the electrical ground through the output line 17 of the power supply to a very small extent.

As illustrated in FIG. 7 for the cancellation winding 192a, in order to cancel out a capacitive coupling generated from the first input winding 221a to the output winding 223 having a potential with the opposite polarity, the second input winding 222a should have a potential with the opposite polarity greater than that of the output winding 223 and have a number of turns greater than that of the output winding 223. Furthermore, the number of turns of the second input winding 222a for cancellation may be set far greater than that of the output winding 223 according to an amount of capacitive coupling due to an electric field generated in the opposite direction to the direction of the first input winding 221a facing the output winding 223. Furthermore, the flyback voltage of the second input winding 222a may be rectified and smoothened by a diode 20 and a capacitor 22 and used as an auxiliary power source for the driving circuit 18. In this case, additional windings for supplying the auxiliary power source may be not required, thus simplifying the structure of windings to reduce the cost.

Referring to FIG. 18, high frequency noises generated from the first input winding 221a and second input winding 222a by a current change of the switching element 12 illustrated in FIG. 19 have symmetrically opposite polarities to each other.

When the first input winding 221a and second input winding 222a are capacitively coupled to allow high frequency noise generated from the first input winding 221a to be overlapped with the second input winding 222a, high frequency noise of the second input winding 222a is cancelled out and reduced. In this case, low high frequency noise is transferred to the output winding 223 wound and capacitively coupled to face the second input winding 222a, thereby having an additional advantage in that high frequency noise radiation through the output line of the power supply is reduced. Furthermore, high frequency noise generated from the second input winding 222a is overlapped with the first input winding 221a and thus high frequency noise generated from the first input winding 221a is cancelled out and weakened.

In the actual use, resistors and capacitors may be also placed at appropriate positions, such as the first input winding 221a, second input winding 222a, output winding 223, switching element 12, output rectifier 14a, or the like to further reduce high frequency noise radiation, but it is generally known and thus not described in all the drawings proposed to describe the present invention.

The present invention described above with reference to FIGS. 17 through 19 will be summarized again below.

The transformer 22a of the present invention according to Principle 3 in FIG. 17 may include a core 226 of the magnetic energy-transfer element; a first input winding 221a wound around the core 226 of the transformer, and connected between the "+" input voltage terminal and one side terminal of the switching element 12, wherein the flow of current and the transfer of magnetic energy are switched by the switching operation of the switching element 12; and a second input winding wound 222a around the core 226 of the transformer, and connected between the "−" input voltage terminal and the other side terminal of the switching element 12, wherein the flow of current and the transfer of magnetic energy are switched by the switching operation of the switching element 12, wherein an effect exerted to the outside due to a potential variation and generated noise of the first input winding 221a by the switching operation of the switching element 12 and an effect exerted to the outside due to a potential variation and generated noise of the second input winding 222a by the switching operation of the switching element 12 are cancelled out due to their opposite polarities.

Furthermore, the transformer 22a of the present invention according to Principle 3 in FIG. 17 may include a core 226 of the magnetic energy-transfer element; a first input winding 221a wound around the core 226 of the transformer, and connected between the "+" input voltage terminal and one side terminal of the switching element 12, wherein the flow of current and the transfer of magnetic energy are switched by the switching operation of the switching element 12; a second input winding wound 222a around the core 226 of the transformer, and connected between the "−" input voltage terminal and the other side terminal of the switching element 12, wherein the flow of current and the transfer of magnetic energy are switched by the switching operation of the switching element 12; and an output winding 223 magnetically coupled to the first input winding 221a and the second input winding 222a to take out energy, wherein an effect exerted to the outside due to a potential variation and generated noise of the first input winding 221a by the switching operation of the switching element 12 and an effect exerted to the outside due to a potential variation and generated noise of the second input winding 222a by the switching operation of the switching element 12 are cancelled out due to their opposite polarities.

Furthermore, in the transformer 22a of the present invention according to Principle 3 in FIG. 17, high frequency noise generated and emitted from the first input winding 221a by the switching operation of the switching element 12 and high frequency noise generated and emitted from the second input winding 222a by the switching operation of the switching element 12 have opposite polarities and thus are cancelled out each other.

Furthermore, in the transformer 22a of the present invention according to Principle 3 in FIG. 17, as disclosed in the description of FIG. 18, a capacitive coupling generated to lines and elements within the power supply due to a potential variation of the first input winding 221a by the switching operation of the switching element 12 and a capacitive coupling with the opposite polarity generated to lines and elements within the power supply due to a potential variation of the second input winding 222a by the switching operation of the switching element 12 have opposite polarities and thus are cancelled out.

Furthermore, in the transformer 22a of the present invention according to Principle 3 in FIG. 17, the second input winding 222a is located between the first input winding 221a and the output winding 223.

Furthermore, in the transformer 22a of the present invention according to Principle 3 in FIG. 17, in order to reduce the conducted noise of the power supply including the transformer 22a, the number of turns of the second input winding 222a wound per unit area of one winding layer for generating a capacitive coupling between the second input winding 222a and the output winding 223 required to cancel out and reduce the sum of capacitive couplings generated from windings other than the output winding 223 and the core 226 of the transformer to the output winding 223 is greater than that of the output winding 223 wound per unit area of one winding layer.

Furthermore, in the transformer 22a of the present invention according to Principle 3 in FIG. 17, an electric field generated from a winding surface of the winding located at an opposite end in the direction of the first input winding 221a facing the output winding 223 to the opposite direction to the direction of the first input winding 221a facing the output winding 223 is capacitively coupled to the second input winding 222a through the core 226 of the transformer.

Furthermore, in the transformer 22a of the present invention according to Principle 3 in FIG. 17, as increasing an amount of capacitive coupling generated to the output winding 223 by an electric field formed in the opposition direction to the direction facing the output winding 223 from the winding surface of a winding layer located at an opposite end in the direction facing the output winding 223 among the winding layers of the first input winding 221a, the number of turns of the second input winding 222a wound per unit area of one winding layer is greater than that of the output winding 223 wound per unit area of one winding layer.

Referring to FIG. 18, in the transformer 22a, a winding layer having the highest potential variation among the winding layers of the input winding 221a is located at an end in the opposite direction to the direction facing the output winding 223 and generates an electric field in the opposite direction to the direction facing the output winding 223. As illustrated in FIG. 8, when the input voltage is very high in the structure of the transformer 22a, an electric field generated by a winding layer having the highest potential variation among the winding layers of the first input winding 221a is very high, and thus required to be reduced.

Figure 20:
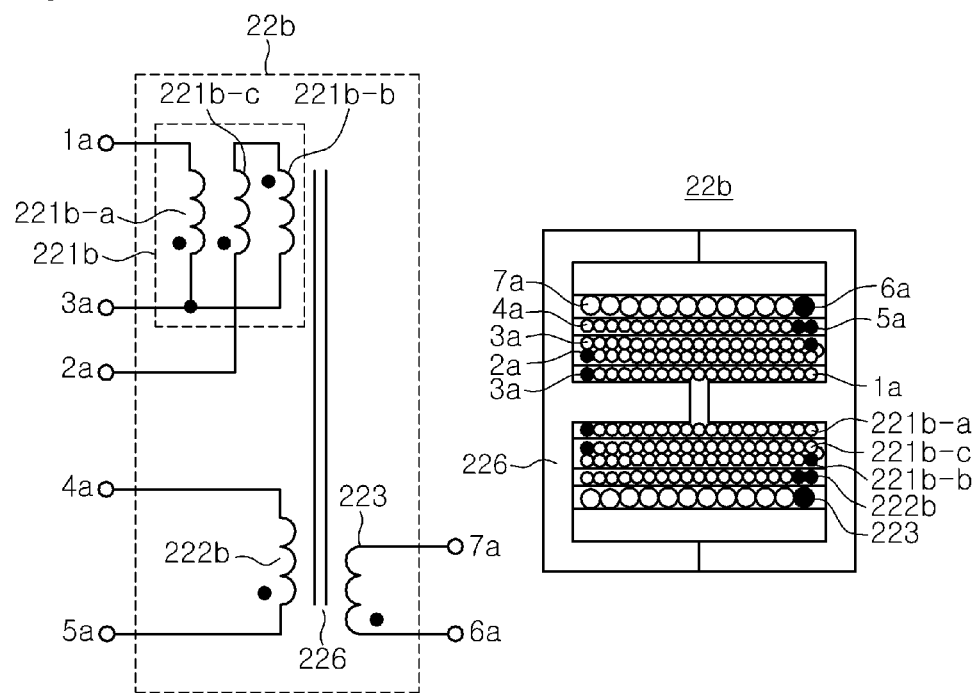
FIG. 20 is another embodiment illustrating a transformer configured according to Principle 3 in FIG. 17.

FIG. 20 illustrates the structure of a transformer 22b which is an embodiment corresponding to a case of high input voltage. In the transformer 22b of FIG. 20, a winding layer 221b-a having the lowest potential variation among the winding layers of the first input winding 221b is located at an end in the opposite direction to the direction facing the output winding 223 and generates an electric field in the opposite direction to the direction facing the output winding 223. Furthermore, in the transformer 22b, a winding layer 221b-c having the highest potential variation among the winding layers of the first input winding 221b is located between the winding layer 221b-a having the lowest potential variation and a winding layer 221b-b having a middle potential variation, and thus it is prevented for a high spike voltage of the winding layer 221b-c having the highest potential variation to be coupled capacitively to the second input winding 222b, thus distorting the waveform and a cancellation error does not occur.

As disclosed in the description of FIG. 10, the location arrangement of a winding layer having the lowest potential variation width, a winding layer having the highest potential variation width, and a winding layer having a middle potential variation width among the winding layers of the first input winding 221b-a to 221b-c may be configured in various ways according to the size of the input voltage or the size of the potential variation width of the first input winding 221b.

The transformer 22b generates an electric field in the opposite direction to the direction facing the output winding 223 by the potential of a winding layer located at an end in the opposite direction to the direction facing the output winding 223. The strength of an electric field generated in the opposite direction to the direction facing the output winding 223 can be set by choosing the location and number of turns of each winding layer 221b-a to 221b-c of the first input winding 221b, and the number of turns of the second input winding 222b for cancellation may be set to a desired value suitable to the productivity.

On the other hand, in the transformer 22b, the high frequency noise of the winding layer 221b-b having a middle potential variation among the winding layers of the first input winding 221b-a to 221b-c is transferred to the second input winding 222b through a distributed capacitance to be overlapped, thereby cancelling out and reducing high frequency noise generated from the second input winding 222b.

Figure 21:
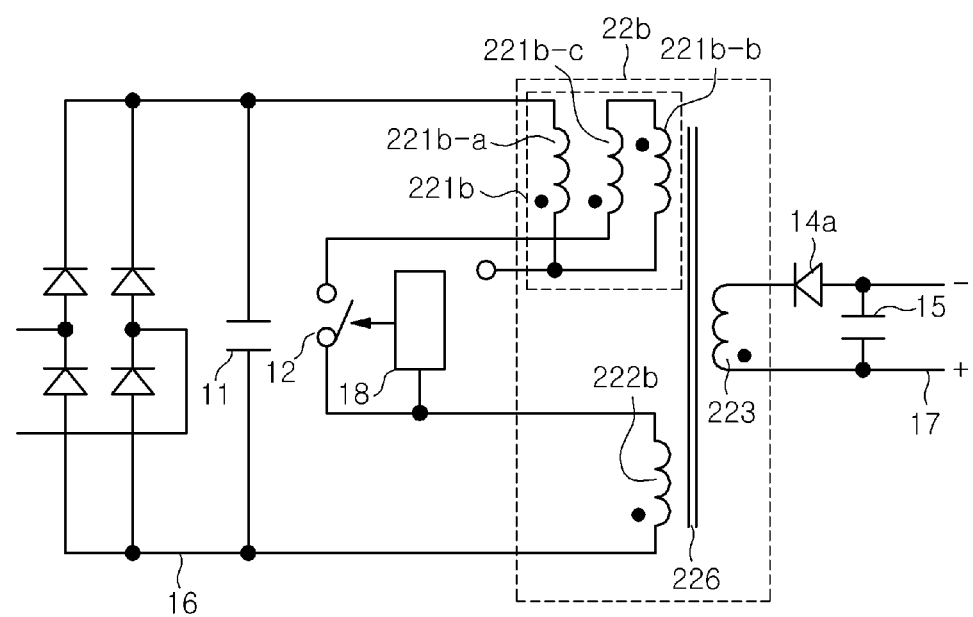
FIG. 21 is a configuration diagram illustrating a flyback converter to which the transformer of FIG. 20 is applied.

FIG. 21 is a configuration diagram illustrating a flyback transformer to which the transformer 22b is applied, and the elements other than the transformer 22b correspond to those of FIG. 19.

The present invention described above with reference to FIGS. 20 and 21 will be summarized again below.

In the transformer 22b of the present invention according to Principle 3 in FIG. 17, the location arrangement of the winding layer 221b-a having the lowest potential variation width, the winding layer 221b-b having the highest potential variation width, and winding layer 221b-c having a middle potential variation width among the winding layers of the first input winding 221b may be configured in various ways.

Furthermore, in the transformer 22b of the present invention according to Principle 3 in FIG. 17, the winding layer 221b-b having the highest potential variation width among the winding layers of the input winding 221b may be located between the winding layer 221b-a having the lowest potential variation width among the winding layers of the input winding 221b and the remaining winding layers.

Furthermore, in the transformer 22b of the present invention according to Principle 3 in FIG. 17, the number of turns of a winding layer located at an end in the opposite direction to the direction facing the output winding 223 among the winding layers of the first input winding 221b-a to 221b-c may be differently selected from the number of turns of the other winding layers of the first input winding 221b-a to 221b-c to set the number of turns of the second input winding 222b wound per unit area of one winding layer to a target value.

Figure 22:
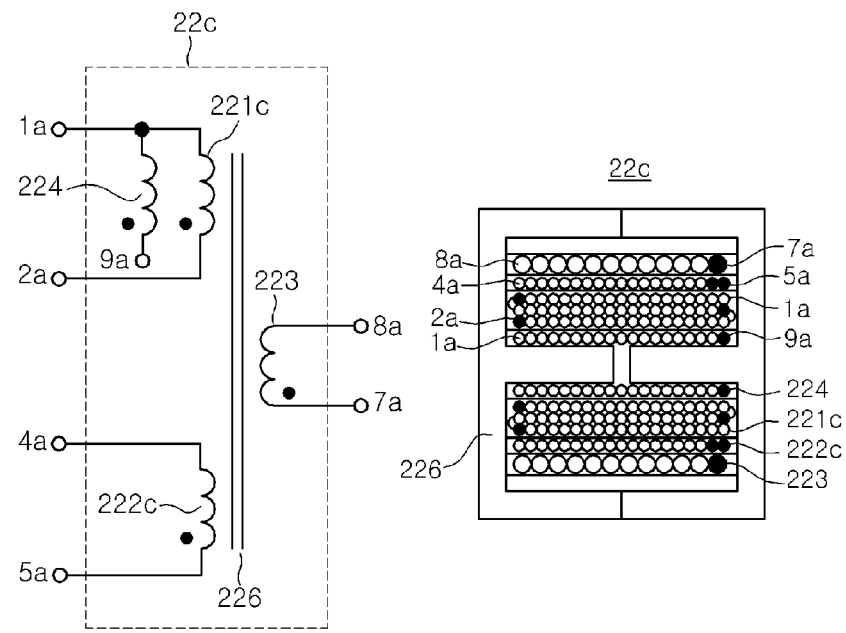
FIG. 22 is still another embodiment illustrating a transformer configured according to Principle 3 in FIG. 17.

FIG. 22 illustrates the structure of a transformer 22c in which the strength of an electric field generated in the opposite direction to the direction facing the output winding 223 is set by the core bias winding 224, thus setting the number of turns of the second input winding 222c for cancelling out a capacitive coupling generated to the output winding 223 to a desired value, as disclosed in the description of FIGS. 12 and 13.

Referring to FIG. 22, when the number of turns of the second input winding 222c required for cancellation is not required to be greater than that of the output winding 223, the number of turns of the core bias winding 224 may be small, and under the circumstances, the potential variation of the core bias winding 224 has an opposite polarity to that of the potential variation of the first input winding 221c, and thus the core bias winding 224 may be used for the purpose of shielding a capacitive coupling between the first input winding 221c and the transformer core 226.

Figure 23:
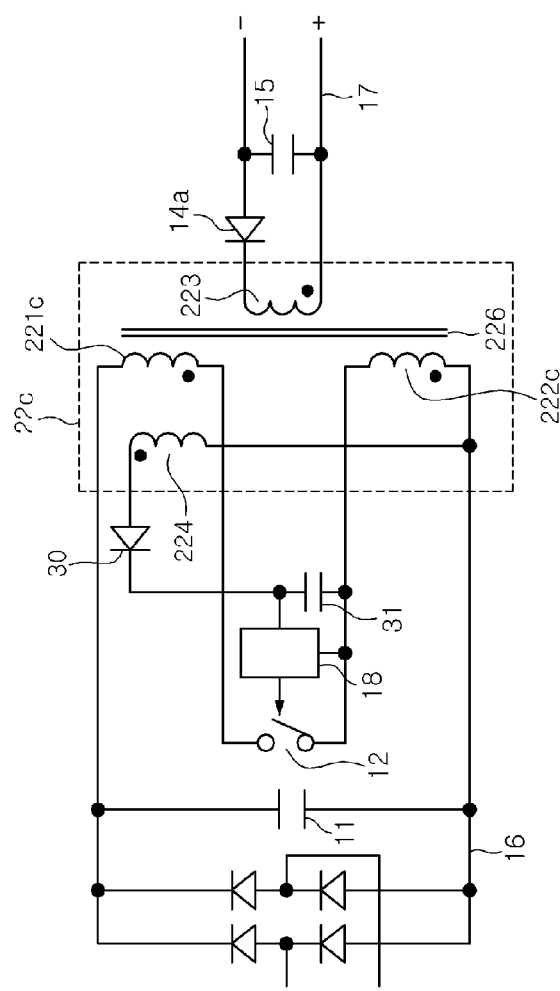
FIG. 23 is a configuration diagram illustrating a flyback converter to which the transformer of FIG. 22 is applied.

FIG. 23 is a configuration diagram illustrating a flyback converter to which the transformer 22c is applied, and illustrates an embodiment in which the sum of flyback voltages of the core bias winding 224 and second input winding 222c of the transformer 22c is rectified and smoothened with the capacitor 31 and used as an auxiliary power source for the driving circuit 18. The other elements correspond to those of FIG. 19.

The present invention described above with reference to FIGS. 22 and 23 will be summarized again below.

The transformer 22c of the present invention according to Principle 3 in FIG. 17 may further include a core bias winding 224 configured to shield a capacitive coupling due to a potential variation between a winding layer located farthest from the output winding 223 among the winding layers of the first input winding 221c and the transformer core 226. The core bias winding 224 may have a potential variation with the same polarity or opposite polarity as that of the potential variation of the first input winding 221c.

Furthermore, the transformer 22c of the present invention according to Principle 3 in FIG. 17 may further include a core bias winding 224 wound between a winding layer located farthest from the output winding 223 among the winding layers of the first input winding 221c and the transformer core 226 to have the same polarity of potential variation as that of potential variation of the first input winding 221c, wherein an amount of capacitive coupling generated to the output winding 223 by an electric field formed from a winding surface of the winding layer located at an opposite end in the direction of the first input winding 221c facing the output winding 223 in the opposite direction to the direction facing the output winding 223 is set by the number of turns of the core bias winding 224.

Figure 24:
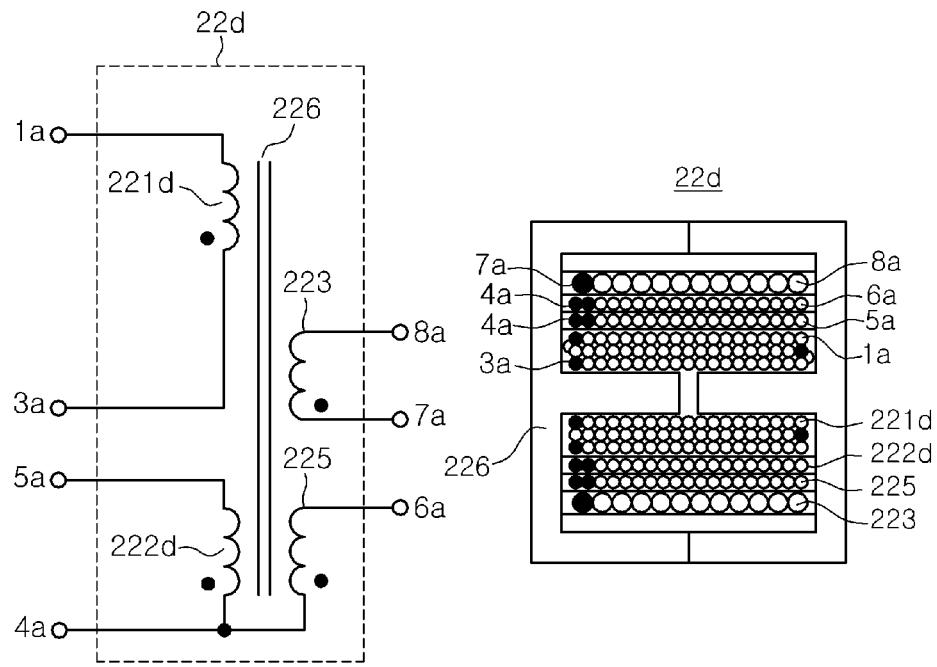
FIG. 24 is yet still another embodiment illustrating a transformer configured according to Principle 3 in FIG. 17.

FIG. 24 illustrates a transformer 22d in which a second input winding 222d is located between a first input winding 221d and the output winding 223 and a cancellation winding 225 is located between the second input winding 222d and the output winding 223.

The transformer 22d may be used to prevent an affect caused by the application of a surge voltage such as static electricity applied to the output winding 223, and the surge voltage transferred to the cancellation winding 225 through the output winding 223 is bypassed to the AC ground and thus a reduced voltage is applied to the second input winding 222d to protect the switching element 12 or the like.

The cancellation winding 225 of the transformer 22d is wound to fill one winding layer between the second input winding 222d and the output winding 223 with no gap and shield a capacitive coupling due to an electric field generated in the direction of the first input winding 221d and second input winding 222d facing the output winding 223, thus generating a very low electric field.

The cancellation winding 225 of the transformer 22d generates a capacitive coupling between the cancellation winding 225 and the output winding 223 to cancel out and remove the sum of capacitive couplings generated from windings other than the cancellation winding 225 and the transformer core 226 contained in the transformer 22d to the output winding 223. The number of turns of the cancellation winding 225 for cancellation should have a potential variation with the greater opposite polarity than that of the output winding 223 to generate a capacitive coupling with the opposite polarity to the sum of capacitive couplings among the output winding 223 having a potential variation with the opposite polarity to that of the potential variation of the input winding 221d and the first input winding 221d and second input winding 222d. To this end, the number of turns of the cancellation winding 225 is greater than that of the output winding 223.

Figure 25:
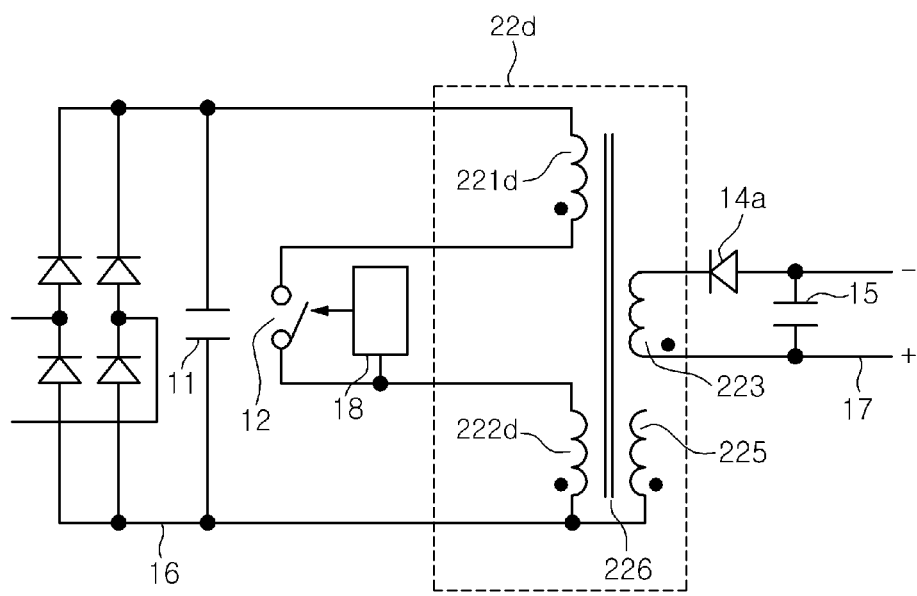
FIG. 25 is a configuration diagram illustrating a flyback converter to which the transformer of FIG. 24 is applied.

FIG. 25 is a configuration diagram illustrating a flyback converter to which the transformer 22d is applied, and the elements other than the transformer 22d correspond to those of FIG. 19.

The present invention described above with reference to FIGS. 24 and 25 will be summarized again below.

The transformer 22d of the present invention according to Principle 3 in FIG. 17 may further include a cancellation winding 225 configured to shield a capacitive coupling due to a potential variation between the second input winding 222d and the output winding 223, and cancel out the sum of capacitive couplings due to a potential variation generated from windings other than the output winding 223 and the transformer core 226 to the output winding.

Furthermore, in the transformer 22d of the present invention according to Principle 3 in FIG. 17, the number of turns of the cancellation winding 225 wound per unit area of one winding layer required to cancel out and reduce the sum of capacitive couplings due to a potential variation generated from windings other than the output winding 223 and the transformer core 226 to the output winding is greater than that of the output winding 223 wound per unit area of one winding layer.

Figure 26:
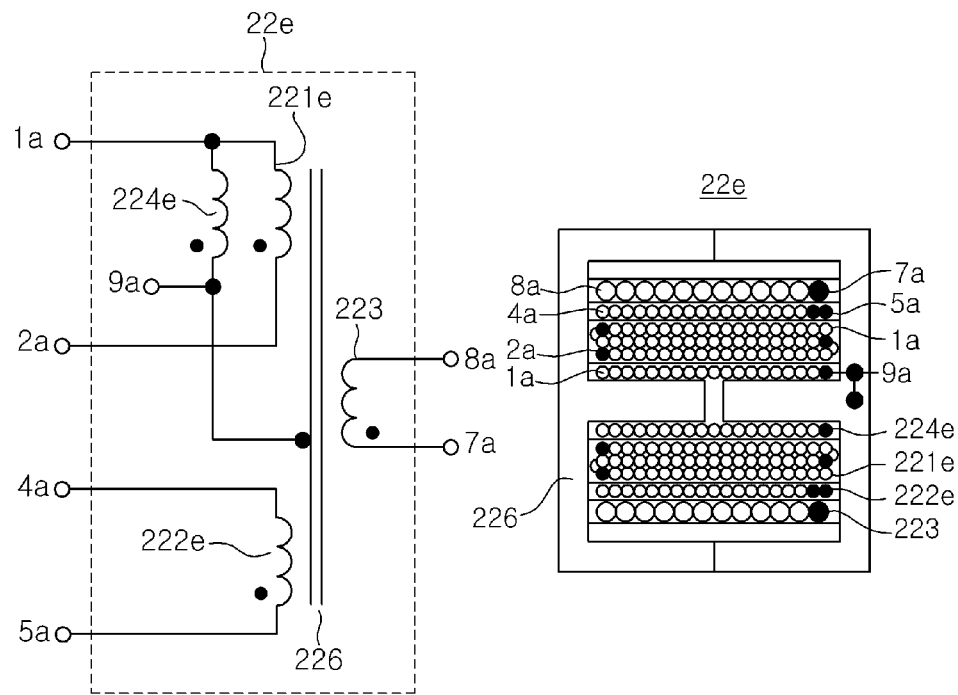
FIG. 26 is still yet another embodiment illustrating a transformer configured according to Principle 3 in FIG. 17.
Figure 27:
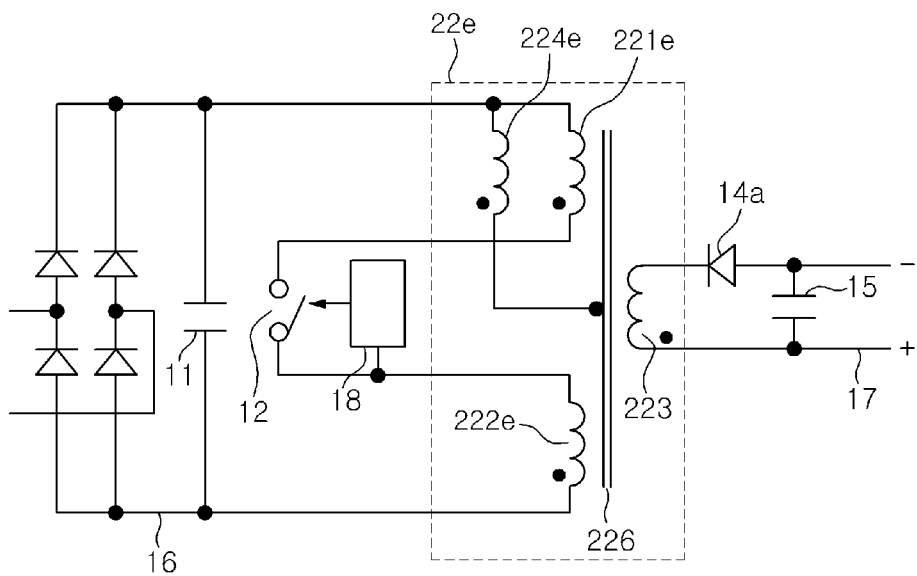
FIG. 27 is a configuration diagram illustrating a flyback converter to which the transformer of FIG. 26 is applied.

FIG. 26 illustrates a transformer 22e in which a terminal end of the core bias winding 224e is connected to the transformer core 226 to allow the transformer core 226 to form an electric field with a potential of the core bias winding 224e, thereby determining an amount of capacitive coupling to the output winding 223, and setting the number of turns of the second input winding 222e required for cancellation to a desired value by controlling the number of turns of the core bias winding 224e, and FIG. 27 is a configuration diagram illustrating a flyback converter to which the transformer 22e is applied, and the elements other than the transformer 22e correspond to those of FIG. 19.

The present invention described above with reference to FIGS. 24 and 25 will be summarized again below.

The transformer 22e of the present invention according to Principle 3 in FIG. 17 may further include a core bias winding 224e wound between a winding layer located farthest from the output winding 223 among the winding layers of the first input winding 221e and the transformer core 226 and one side terminal having a potential variation with the same polarity as a potential variation of the first input winding 221e is connected to the transformer core 226, wherein an amount of capacitive coupling generated to the output winding 223 by an electric field formed in the transformer core 226 is set by the number of turns of the core bias winding 224e.

FIGS. 19, 21, 28 through 30 are configuration diagrams illustrating a flyback converter of the present invention for suppressing the generation of high frequency noise or preventing high frequency noise from being transferred to the output winding.

Referring to FIG. 19, high frequency noise generated from the first input winding 221a due to a fast change of current flow by driving the switching element 12 has an opposite polarity to high frequency noise generated from the second input winding 222a having the same change of current flow. The first input winding 221a and the second input winding 222a are capacitively coupled through a distributed capacitance, and high frequency noise with the opposite polarity generated from the first input winding 221a is overlapped with high frequency noise generated from the second input winding 222a, and thus the high frequency noise of the second input winding 222a is cancelled out and reduced. The reduced high frequency noise is transferred to the output winding 223 located to face the second input winding 222a having the reduced high frequency noise, and thus high frequency noise radiation through the output line of the power supply is reduced. Furthermore, high frequency noise with the opposite polarity generated from the second input winding 222a is also transferred to the first input winding 221a, and high frequency noise generated from the second input winding 222a is overlapped with high frequency noise generated from the first input winding 221a, and thus the high frequency noise of the first input winding 221a is cancelled out and reduced.

The present invention described above with reference to FIG. 19 will be summarized again below.

In the transformer 22a of the present invention according to Principle 3 in FIG. 17, the first input winding 221a and the second input winding 222a are capacitively coupled, and thus high frequency noise generated from the first input winding 221a and high frequency noise with the opposite polarity generated from the second input winding 222a are cancelled out and reduced.

Furthermore, in the transformer 22a of the present invention according to Principle 3 in FIG. 17, the first input winding 221a and the second input winding 222a are capacitively coupled, and thus high frequency noise generated from the second input winding 222a is cancelled out and reduced by high frequency noise with the opposite polarity generated from the first input winding 221a, and high frequency noise transferred from the second input winding 222a to the output winding 223 is reduced.

Referring to FIG. 19, in order to cancel out and remove high frequency noise generated from the second input winding 222a, the size of noise transferred from the first input winding 221a to the second input winding 222a should be the same as the size of high frequency noise generated from the second input winding 222a. To this end, a winding layer of the first input winding 221a capacitively coupled to the second input winding 222a among the winding layers of the first input winding 221a through a distributed capacitance to transfer noise with the same size as that of high frequency noise generated from the second input winding 222a should be selected and coupled thereto.

FIG. 21 is one of solutions for that purpose, illustrating an example in which a middle layer 221b-b of the first input winding 221b and the second input winding 222b are coupled by a distributed capacitance between windings, and thus high frequency noise generated from the second input winding 222b is cancelled out and removed by high frequency noise with the opposite polarity generated from the middle layer 221b-b of the first input winding 221b. A ratio of the number of turns of each layer of the first input winding 221b is chosen to set the size of high frequency noise of the middle layer 221b-b of the first input winding 221b to a value required to remove the high frequency noise of the second input winding 222b.

Referring to FIG. 21, as decreasing the ratio of the number of turns of the second input winding 222b with respect to the number of turns of the first input winding 221b, the size of high frequency noise generated from the second input winding 222b is less than that generated from the first input winding 221b, and greater than that generated from the first input winding 221b as increasing the ratio.

Accordingly, one of the winding layers 221b-a to 221b-c of the first input winding 221b coupled to the second input winding 222b should be selected to cancel out and remove high frequency noise generated from the second input winding 222b according to the ratio of the number of turns of the second input winding 222b with respect to the number of turns of the first input winding 221b. Furthermore, in order to remove the high frequency noise of the second input winding 222b, the number of turns of each winding layer 221b-a to 221b-c of the first input winding 221b may be chosen, and the size of the overlapped high frequency noise with the second input winding 222b through a distributed capacitance between windings and the size of the generated high frequency noise with the opposite polarity from the second input winding 222b are able to set to be equal.

The present invention described above with reference to FIG. 21 will be summarized again below.

In the transformer 22b of the present invention according to Principle 3 in FIG. 17, the first input winding 221b and the second input winding 222b are coupled through a distributed capacitance between the two windings and thus high frequency noise generated from the second input winding 222b is cancelled and reduced by high frequency noise with the opposite polarity generated from the first input winding 221b.

In the transformer 22b of the present invention according to Principle 3 in FIG. 17, a winding layer of the first input winding 221b located closest to the second input winding 222b is one of the winding layer 221b-a having the lowest potential variation width, the winding layer 221b-c having the highest potential variation width, and the winding layer 221b-b having a middle potential variation width.

In the transformer 22b of the present invention according to Principle 3 in FIG. 17, the number of turns of one or more winding layers of the first input winding 221b may be differently selected from that of the other winding layers to configure the size of high frequency noise of the first input winding 221b coupled to the second input winding 222b through a distributed capacitance to an optimal size required for cancellation.

Figure 28:
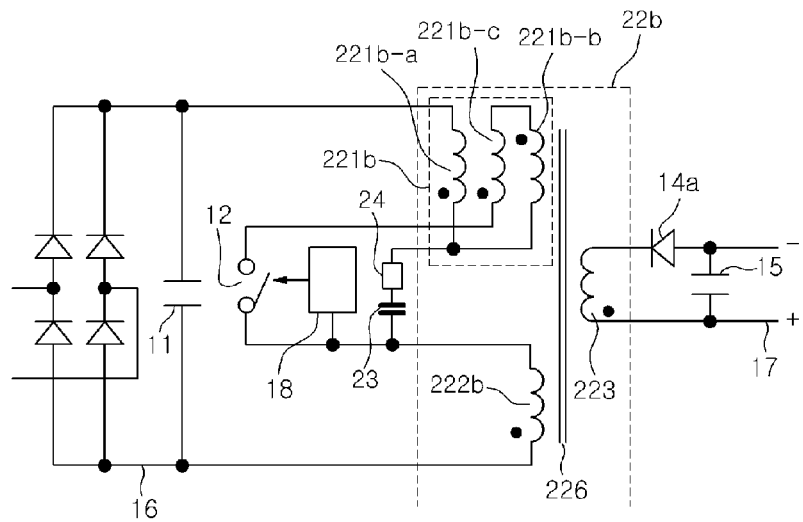
FIGS. 28 through 30 are embodiments for suppressing the generation of high frequency noise in a flyback converter to which the transformer of Principle 3 in FIG. 17 is applied.

FIG. 28 illustrate an example in which part of the first input winding 221b and the second input winding 222b are coupled through the resistor 24 and capacitor 23 in addition to coupling the middle layer 221b-b of the first input winding 221b and second input winding 222b through a distributed capacitance between the windings. Noise transferred from the first input winding 221b due to coupling cancels and removes high frequency noise with the opposite polarity generated from the second input winding 222b, thereby preventing high frequency noise from being transferred to the output winding 223.

Figure 29:
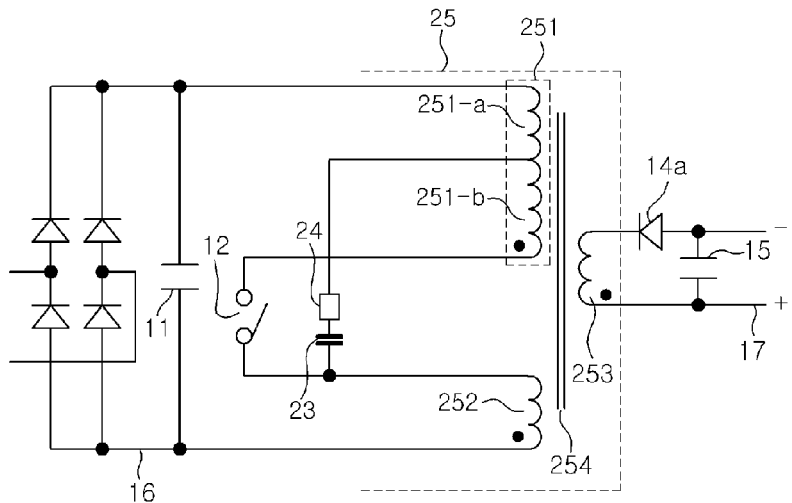

FIG. 29 is an embodiment in which a tap 251a and 251b of the first input winding 251 and the second input winding 252 are coupled through the resistor 24 and capacitor 23, in order to cancel out the high frequency noise of a partial winding of the first input winding 251 and the high frequency noise with the opposite polarity of the second input winding 252 in parallel with the cancellation of high frequency noise through a distributed capacitance between a winding layer of the first input winding 251 and the second input winding 252 in a typical winding structure.

The present invention described above with reference to FIGS. 28 and 29 will be summarized again below.

In the transformer 22b or 25 of the present invention according to Principle 3 in FIG. 17, as disclosed in the description of FIGS. 19, 21, 28 and 29, the high frequency noise generated from the second input winding 222b or 225 is cancelled out and reduced by high frequency noise with the opposite polarity generated from the first input winding 221b or 251-a and 251-b by a coupling through a distributed capacitance between the two windings of the first input winding 221b or 251-a and 251-b and the second input winding 222b or 252 and a capacitive coupling through one or more coupling elements. The coupling element may be the capacitor 23 or the capacitor 23 and resistor 24.

Figure 30:
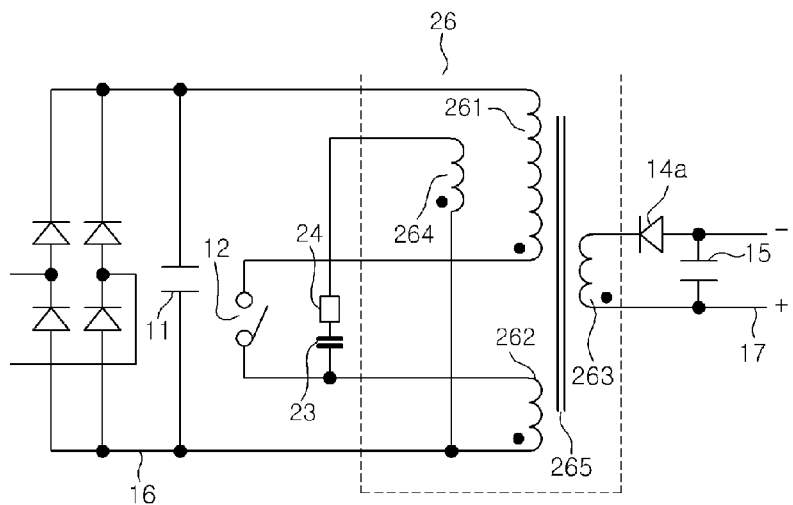

The capacitor of FIG. 28 requires high voltage capability, and is a high cost component. FIG. 30 is provided to change or remove it to a low cost component.

Referring to FIG. 30, the first coupling winding 264 is coupled to part of the first input winding 261 through a distributed capacitance, and the first coupling winding 264 is connected to the second input winding 262 through the capacitor 23 and resistor 24, and high frequency noise generated from part of the first input winding 261 is transferred to the first coupling winding 264 through a distributed capacitance and overlapped with the high frequency noise with the opposite polarity of the second input winding 262 to cancel out the high frequency noise of the second input winding 262. Here, the first coupling winding 264 may be connected to the second input winding 262 through the resistor 24 or directly connected to the second input winding 262. Referring to FIG. 30, when the high frequency noise of the second input winding 262 is effectively removed, the first coupling winding 264 does not have high frequency noise, and the first input winding 261 does not radiate high frequency noise to the outside because of surrounding with the winding 264 and second input winding 262 from which high frequency noise is removed.

The present invention described above with reference to FIG. 30 will be summarized again below.

The transformer 26 of the present invention according to Principle 3 in FIG. 17 may further include the first coupling winding 264 wound to face the first input winding 261 as disclosed in the description of FIG. 30, and the first input winding 261 and second input winding 262 are coupled through a distributed capacitance between the first input winding 261 and the second input winding 262, and also coupled through a distributed capacitance between the first input winding 261 and first coupling winding 264, and thus high frequency noise generated from second input winding 262 is cancelled out and reduced by high frequency noise with the opposite polarity generated from the first input winding 261. Here, the second input winding 262 and first coupling winding 264 may be connected to each other directly, or connected through the capacitor 23, or through the capacitor 23 and resistor 24, or through the resistor 24.

According to the foregoing embodiments of the present invention, the number of turns of the second input winding 222a to 222e can be set to a desired value suitable to the productivity far greater than that of the output winding 223, and one winding layer can be filled and wound with no gap with about two strands of thin wire, thereby enhancing the productivity in the winding work of the transformer. Furthermore, a flyback voltage of the second input winding 222a to 222e is rectified to supply an auxiliary power source, and thus the auxiliary winding may be removed compared to the related art in which the auxiliary winding should be separately wound, thereby reducing the unit cost of the transformer. Furthermore, a variation in the physical location of the second input winding 222a to 222e that fills one layer with no gap is low to generate a small deviation of coupling to the output winding, thereby stabilizing the deviation of EMI to a large extent due to uniform cancellation even during mass production. Furthermore, the generation and radiation of high frequency noise can be reduced, thereby reducing the cost of the line filter or the like.

[Third Embodiment]

Figure 31:
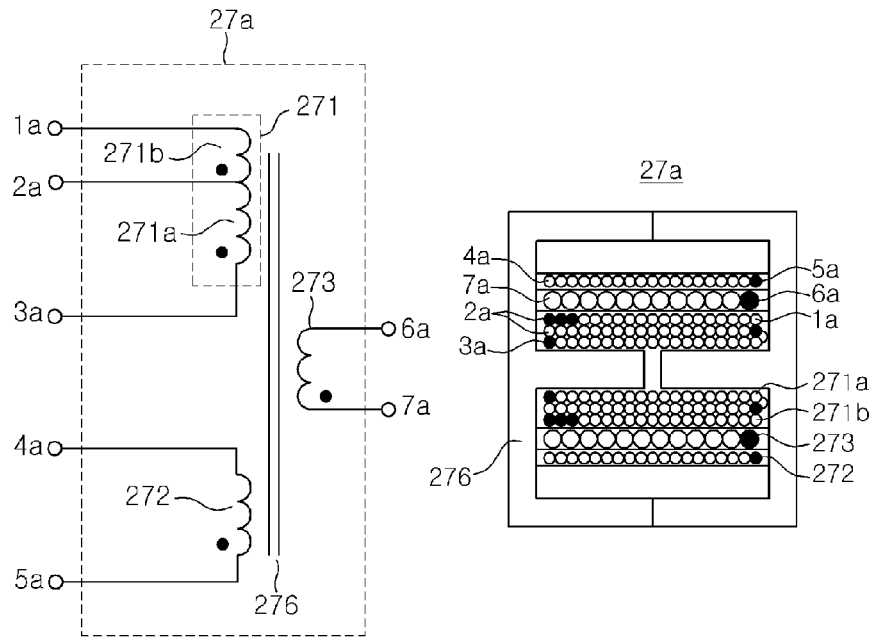
FIG. 31 is an embodiment illustrating a transformer having a sandwich winding structure according to the present invention.
Figure 32:
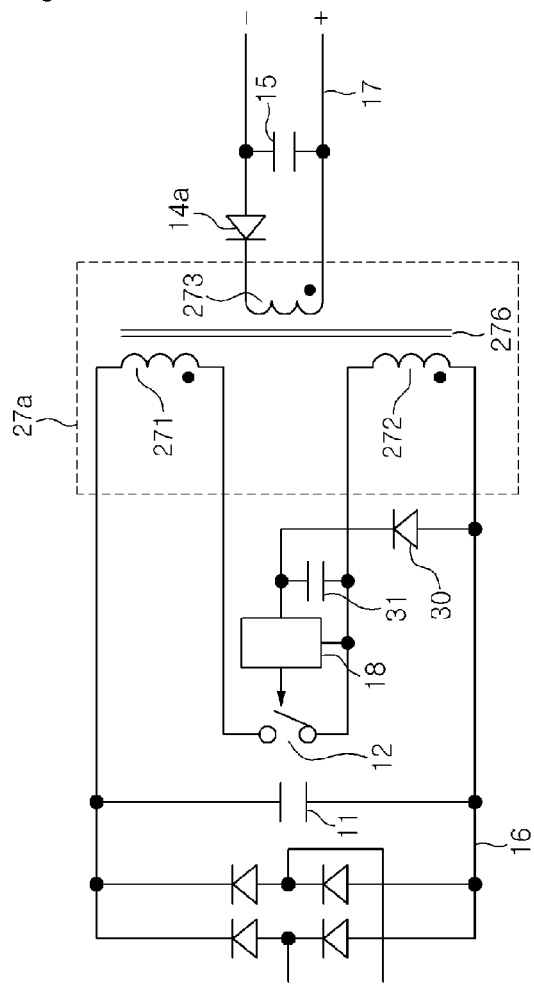
FIG. 32 is a configuration diagram illustrating a flyback converter to which the transformer of FIG. 31 is applied.

FIG. 31 illustrates a transformer 27a that is an embodiment of a sandwich winding structure having a structure for cancelling out conducted noise and high frequency radiated noise according to the present invention, and FIG. 32 is a configuration diagram illustrating a flyback converter to which the transformer 27a of FIG. 31 is applied.

Referring to FIGS. 31 and 32, the input winding of the transformer 27a is divided into a first input winding 271 and a second input winding 272. The first input winding 271 connected between a "+" input voltage and the switching element 12 and the second input winding 272 connected between a "−" input voltage and the switching element 12 store and emit magnetic energy with potential variations having the opposite polarity, respectively, by the switching operation of the switching element 12, and thus deliver rectified and smoothened energy with the output rectifier 14a and capacitor 15 through the output winding 273 to the load.

The potential variation of a terminal connected to the switching element 12 among the terminals of the first input winding 271 of the transformer 27a is generated in an opposite polarity to that of a terminal connected to the switching element 12 among the terminals of the second input winding 272, and high frequency noise generated from the first input winding 271 due to the same change of current flow by driving the switching element 12 has an opposite polarity to high frequency noise generated from the second input winding 272. Accordingly, a coupling generated by a capacitive coupling to the input line 16 or output winding 273 due to a potential variation of the first input winding 271 has an opposite polarity to a coupling generated by a capacitive coupling to the input line 16 or output winding 273 due to a potential variation of the second input winding 272 and thus cancelled out, and a current flowing to the electrical ground through the input line 16 or output line 17 of the power supply is reduced to a large extent compared to FIG. 1. Furthermore, high frequency noise generated from the first input winding 271 and transferred to the input line 16 or output winding 273 is cancelled out by high frequency noise with the opposite polarity generated from the second input winding 272 and transferred to the input line 16 or output winding 273, and thus radiated noise through the input line 16 or output line 17 is also reduced to a large extent compared to the related art in FIGS. 1 through 6.

Furthermore, a sufficiently large number of turns of the second input winding 272 can be taken compared to that of the output winding 273, and thus it is easy to fill and wind one layer with one or two strands of thin wire, and moreover, a flyback voltage of the second input winding 272 can be rectified and smoothened with the diode 30 and capacitor 31 to take out an auxiliary power source voltage, and thus an auxiliary winding for taking out an additional auxiliary voltage may be not required.

Figure 6:
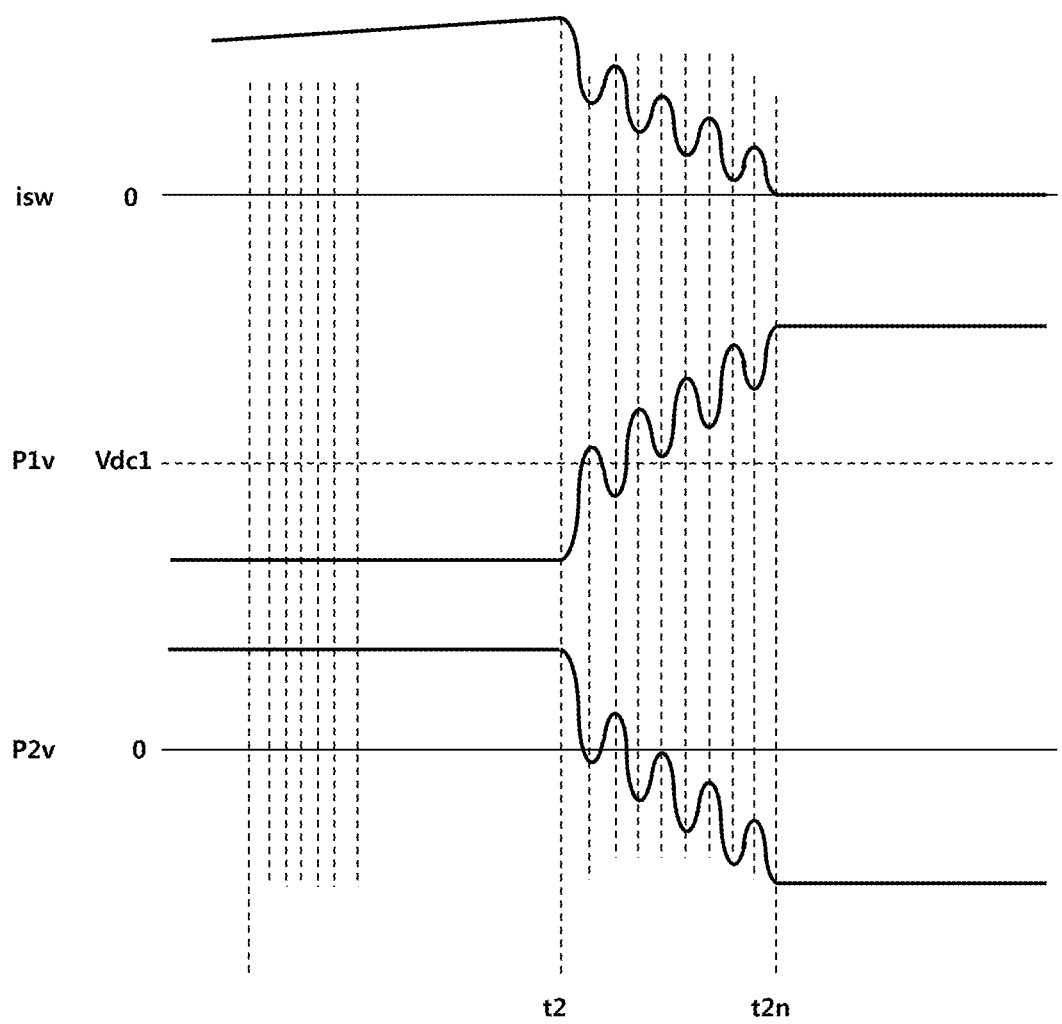
FIG. 6 is an embodiment to which the related art is applied to a sandwich structure.

In the transformer 27a of FIG. 31, both a winding layer 271b of the first input winding 271 and the second input winding 272 have a far lower potential variation compared to a high potential variation of the second input winding 131b in FIG. 6, and even if it has a sandwich winding structure, a large capacitive coupling as disclosed in the related art of FIG. 6 does not occur.

In the transformer 27a which is an embodiment having a sandwich winding structure, a capacitive coupling between the output winding 273 and the first input winding 271 and a capacitive coupling between the output winding 273 and the second input winding 272 are cancelled out each other and removed.

For example, when the number of turns of the second input winding 272 is 30T and the number of turns of the output winding 273 is 8T in the same direction, it has a potential difference due to a difference of 22T in the number of turns with the same polarity between the output winding 273 and the second input winding 272, and when the number of turns of the first input winding 271b capacitively coupled to face the output winding 273 among the winding layers of the first input winding 271 becomes 14T in the opposite direction, it also has a potential difference due to a difference of 22T in the number of turns. An electric field due to a potential of the winding layer 271a of the first input winding 271 is shielded by the winding layer 271b of the first input winding 271 wound to fill one winding layer with no gap, but by taking a capacitive coupling generated from the winding layer 271a of the first input winding 271 to the output winding 273 in spite of shielding into consideration, by increasing the number of turns of the second input winding 272 by 1T or 2T or reducing the number of turns of the winding layer 271b of the first input winding 271 by 1T or 2T, the sum of capacitive couplings generated from the first input winding 271 and second input winding 272 to the output winding 273 is are cancelled out and removed.

Furthermore, high frequency noise generated from the second input winding 272 of 30T and transferred to the input line 16 or output winding 273 is cancelled out by high frequency noise generated from the winding layer 271a having a high potential variation and the winding layer 271b of 14T and transferred to the input line 16 or output winding 273, and thus radiated noise through the input line 16 or output line 17 is greatly reduced compared to the related art in FIGS. 1 through 6.

The output rectifier 14a of FIG. 32 rectifies a negative voltage and smoothens it with the capacitor 15 to obtain a negative output voltage from the output winding 273 since a potential variation of the second input winding 272 of the transformer 27a and a potential variation of the output winding 273 have the same polarity. If the potential variation of the output winding 273 has the same polarity as that of the first input winding 271, the direction of the output rectifier 14a is changed, and the output voltage obtained by smoothening with the capacitor 15 becomes a positive voltage.

The present invention described above with reference to FIGS. 31 and 32 will be summarized again below.

In the transformer 27a of FIG. 31, the output winding 273 is located between the first input winding 271 and the second input winding 272.

In the transformer 27a of FIG. 31, a capacitive coupling generated from the first input winding 271 to the output winding 273 and a capacitive coupling generated from the second input winding 272 to the output winding 273 are cancelled out and reduced.

Figure 33:
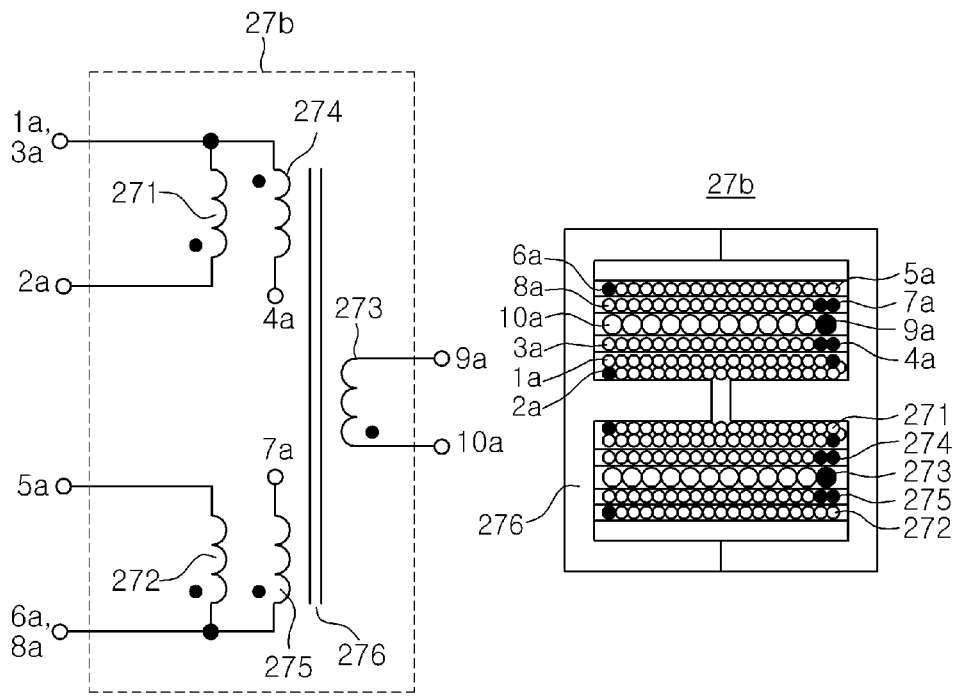
FIGS. 33 through 35 are other embodiments illustrating a transformer having a sandwich winding structure according to the present invention.

The transformer 27b of FIG. 33 may include a first shielding winding 274 between the first input winding 271 and the output winding 273 and a second shielding winding 275 between the second input winding 272 and the output winding 273 in a sandwich structure of the first input winding 271, output winding 273 and second input winding 272.

According to an example of the transformer 27a of FIG. 31, there is disclosed an example in which the second input winding 272 capacitively coupled to the output winding 273 has 30T and the winding layer 271b of the first input winding 271 capacitively coupled to the output winding 273 has 14T. High frequency noise generated from the second input winding 272 of the transformer 27a and transferred to the output winding 273 is different in size from that of high frequency noise generated from the winding layer 271b of the first input winding 271 and transferred to the output winding 273 though it is lower than the related art, and thus they are not completely cancelled out. Furthermore, there is a potential difference corresponding to 22T between the output winding 273 of 8T and the second input winding 272 of 30T, and thus an amount of the generated capacitive coupling is large, and even if removed through cancellation, there is a limit in reducing conducted noise through the output line 17.

FIG. 33 provides a solution which effectively cancels out and removes the high frequency noise transferred from the first input winding 271 to the output winding 273 and the high frequency noise transferred from the second input winding 272 to the output winding 273 by setting both noise size equal, and as well as drastically reducing an amount of the generated capacitive coupling.

Referring to FIG. 33, the first shielding winding 274 and second shielding winding 275 of the transformer 27b shields a capacitive coupling generated from the first input winding 271 and second input winding 272 to the output winding 273, and a coupling generated in spite of shielding is cancelled out by a capacitive coupling between the first shielding winding 274 and the output winding 273 and a capacitive coupling between the second shielding winding 275 and the output winding 273. Furthermore, the number of turns of a layer wound closest to the output winding 273 among the winding layers of the first input winding 271 and second input winding 272 may be chosen to set the size of high frequency noise generated from the second input winding 272 and transferred to the output winding 273 to be same as that of high frequency noise with the opposite polarity generated from the first input winding 271 and transferred to the output winding 273, and thus most of high frequency noise transferred to the output winding 273 is cancelled out and removed, thereby further reducing radiated noise through the output line 17 compared to the example of FIG. 31.

The present invention described above with reference to FIG. 33 will be summarized again below.

The transformer 27b of FIG. 33 may further include the first shielding winding 274 for shielding a capacitive coupling due to a potential variation between the first input winding 271 and the output winding 273, and the second shielding winding 275 for shielding a capacitive coupling due to a potential variation between the second input winding 272 and the output winding 273, in addition to the transformer 27a of FIG. 31.

Figure 34:
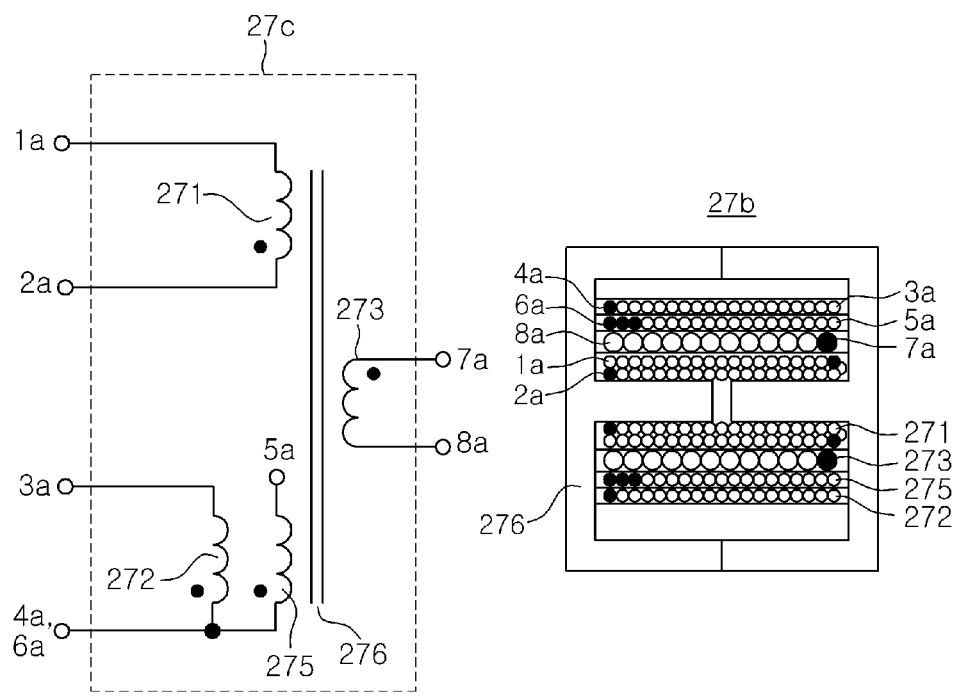

The 27c of FIG. 34 may include a second shielding winding 275 between the second input winding 272 and the output winding 273 in addition to the sandwich structure of the first input winding 271, output winding 273 and second input winding 272 in FIG. 31.

In this case, the number of turns of the winding layer 271b located closest to the output winding 273 among the winding layers of the first input winding 271 may be chosen to be the same or similar to that of the second input winding 272, and thus the size of high frequency noise generated from the second input winding 272 and transferred to the output winding 273 may be allowed to be identical to that of high frequency noise with the opposite polarity generated from the first input winding 271 and transferred to the output winding 273.

The second shielding winding 275 shields a capacitive coupling generated from the second input winding 272 to the output winding 273, and a coupling generated in spite of shielding and a capacitive coupling between the first input winding 271 and the output winding 273 are cancelled out by a capacitive coupling between the second shielding winding 275 and the output winding 273. For example, when the number of turns of the winding layer 271b located closest to the output winding 273 among the winding layers of the first input winding 271 is 30T and the number of turns of the output winding 273 is 8T in the same direction, the number of turns of the second input winding 272 is chosen to about 30T to correspond to the size of high frequency noise. The second shielding winding 275 is chosen to about 14T in the opposite polarity to the first input winding 271 to generate a capacitive coupling with the same size but opposite polarity to a capacitive coupling due to a potential difference of 24T between the first input winding 271 and the output winding 273 to the output winding 273 for cancellation.

Accordingly, radiated noise through the output line 17 may be further reduced compared to the example of FIG. 31.

The present invention described above with reference to FIG. 34 will be summarized again below.

The transformer 27c of FIG. 34 may further include the second shielding winding 275 for shielding a capacitive coupling due to a potential variation between the second input winding 272 and the output winding 273, in addition to the transformer 27a of the FIG. 31.

Figure 35:
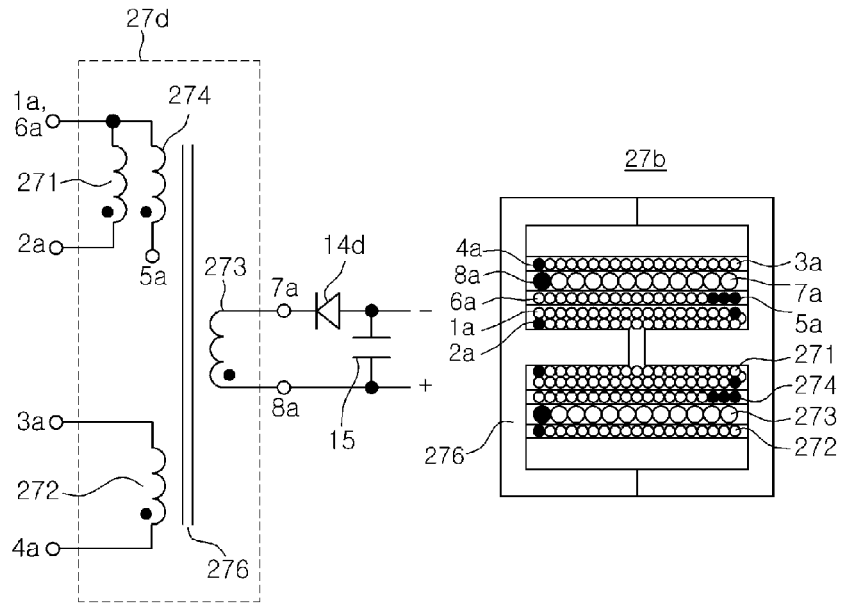

The 27d of FIG. 35 may include a first shielding winding 274 between the first input winding 271 and the output winding 273 in (addition to) a sandwich structure of the first input winding 271, output winding 273 and second input winding 272 of the FIG. 31.

Referring to FIG. 35, the number of turns of the winding layer 271b located closest to the output winding 273 among the winding layers of the first input winding 271 may be chosen to be the same or similar to that of the second input winding 272, and thus the size of high frequency noise generated from the second input winding 272 and transferred to the output winding 273 may be allowed to be identical to that of high frequency noise with the opposite polarity generated from the first input winding 271 and transferred to the output winding 273.

The first shielding winding 274 shields a capacitive coupling generated from the first input winding 271 to the output winding 273, and a coupling generated in spite of shielding and a capacitive coupling between the second input winding 272 and the output winding 273 are cancelled out by a capacitive coupling between the first shielding winding 274 and the output winding 273. For example, when the number of turns of the second input winding 272 is 30T and the number of turns of the output winding 273 is 8T in the same direction, the number of turns of the winding layer 271b located closest to the output winding 273 among the winding layers of the first input winding 271 is chosen to about 30T to correspond to the size of high frequency noise. The first shielding winding 274 is chosen to about 14T in the opposite polarity to the second input winding 272 to generate a capacitive coupling with the same size but opposite polarity to a capacitive coupling due to a potential difference of 24T between the second input winding 272 and the output winding 273 to the output winding 273 for cancellation.

The present invention described above with reference to FIG. 35 will be summarized again below.

The transformer 27d of FIG. 35 may further include the first shielding winding 274 for shielding a capacitive coupling due to a potential variation between the first input winding 271 and the output winding 273, in addition to the transformer 27a of the FIG. 31.

Though not shown in the drawing, in the transformer 27a to 27d in FIGS. 31 through 35, the first input winding 271 and the second input winding 272 may be capacitively coupled using an additional coupling winding or external coupling element in FIGS. 28 through 30 to cancel out noise generated from the first input winding 271 and second input winding 272.

As an application example of FIG. 30, the transformer 27a to 27d may further include a first coupling winding wound to face part of the first input winding 271, wherein part of the first input winding 271 and the second input winding 272 are coupled through a distributed capacitance between the first input winding 271 and the first coupling winding, thereby allowing high frequency noise generated from part of the first input winding 271 and high frequency noise with the opposite polarity generated from the second input winding 272 to be overlapped and cancelled out.

As another application example of FIG. 30, the transformer 27a to 27d may further include a second coupling winding wound to face the second input winding 272, wherein the second input winding 272 and the first input winding 271 are coupled through a distributed capacitance between the second input winding 272 and the second coupling winding, thereby allowing high frequency noise generated from the first input winding 271 and high frequency noise with the opposite polarity generated from the second input winding 272 to be overlapped and cancelled out.

As still another application example of FIG. 30, the transformer 27a to 27d may further include a first coupling winding wound to face part of the first input winding 271 and a second coupling winding wound to face the second input winding 272, wherein the second input winding 272 and the first input winding 271 are coupled through a distributed capacitance between the first input winding 271 and the first coupling winding and a distributed capacitance between the second input winding 272 and the second coupling winding, thereby allowing high frequency noise generated from the first input winding 271 and high frequency noise with the opposite polarity generated from the second input winding 272 to be overlapped and cancelled out.

The present invention not illustrated in the drawing will be summarized again below.

In the transformer 27a to 27d in FIGS. 31 through 35, as disclosed in the description of FIGS. 28 through 30, the first input winding 271 and the second input winding 272 are capacitively coupled to allow high frequency noise generated from the first input winding 271 to cancel out high frequency noise with the opposite polarity generated from the second input winding 272 as well as allow high frequency noise generated from the second input winding 272 to cancel out high frequency noise with the opposite polarity generated from the first input winding 271, thereby reducing high frequency noise generated from the two windings.

Furthermore, in the transformer 27a to 27d in FIGS. 31 through 35, as disclosed in the description of FIGS. 28 through 30, the first input winding 271 and the second input winding 272 are capacitively coupled through one or more coupling elements, and thus high frequency noise generated from the first input winding 271 and high frequency noise with the opposite polarity generated from the second input winding 272 are cancelled out each other and reduced. The coupling element may be a capacitor or a capacitor and a resistor. A connecting point at which one side terminal of the coupling element is connected to the first input winding 271 is a connecting point between the first input winding 271 and the switching element 12 or a central tap of the first input winding 271, and a connecting point at which the other side terminal of the coupling element is connected to the second input winding 272 is a connecting point between the second input winding 272 and the switching element 12 or a central tap of the second input winding 272.

Furthermore, though not shown in the drawing, as an application example of FIG. 30, the transformer 27a to 27d in FIGS. 31 through 35, may further include a first coupling winding wound to face the first input winding 271, and thus the first input winding 271 and the second input winding 272 are coupled through a distributed capacitance between the first input winding 271 and the first coupling winding, thereby cancelling out high frequency noise generated from part of the first input winding 271 and high frequency noise with the opposite polarity generated from the second input winding 272.

Furthermore, though not shown in the drawing, as an application example of FIG. 30, the transformer 27a to 27d in FIGS. 31 through 35 may further include a second coupling winding wound to face the second input winding 272, and thus the second input winding 272 and the first input winding 271 are coupled through a distributed capacitance between the second input winding 272 and the second coupling winding, thereby cancelling out high frequency noise generated from the first input winding 271 and high frequency noise with the opposite polarity generated from the second input winding 272.

Furthermore, though not shown in the drawing, as an application example of FIG. 30, the transformer 27a to 27d in FIGS. 31 through 35, may further include a first coupling winding wound to face the part of the first input winding 271 and a second coupling winding wound to face the second input winding 272, and thus the second input winding 272 and the first input winding 271 are coupled through a distributed capacitance between the first input winding 271 and the first coupling winding and a distributed capacitance between the second input winding 272 and the second coupling winding, thereby cancelling out high frequency noise generated from the first input winding 271 and high frequency noise with the opposite polarity generated from the second input winding 272.

[Fourth Embodiment]

Figure 36:
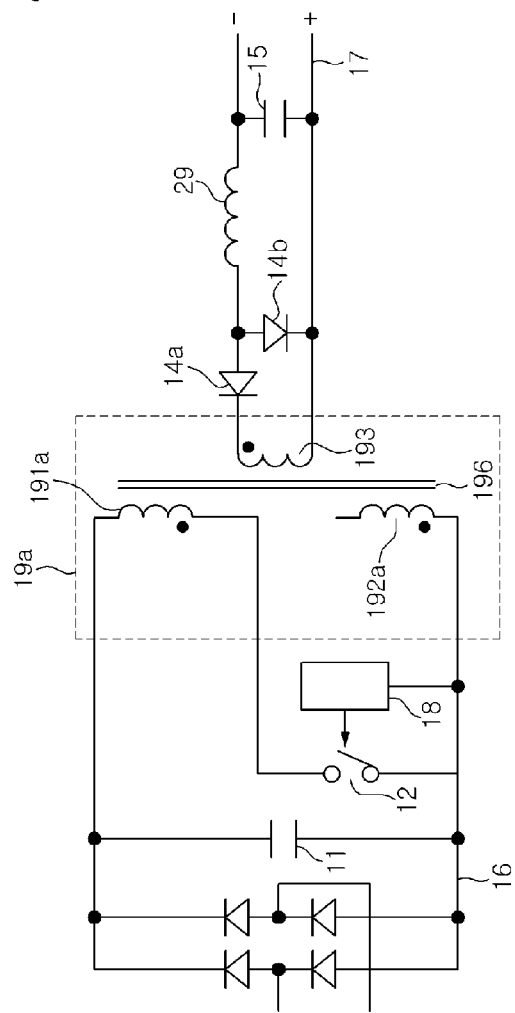
FIGS. 36 and 37 are configuration diagrams illustrating a forward converter according to the present invention.

FIG. 36 is an example of a configuration diagram illustrating a forward converter to which the transformer 19a of FIG. 8 is applied.

The transformer 19a transfers energy through the input winding 191a and the output winding 193 with switching operation of the switching element 12 under the control of the driving circuit 18 using a voltage smoothened with the capacitor 11. A negative output voltage is taken out through the output rectifier 14a, the output rectifier 14b, the inductor 29 and the capacitor 15. Even in FIG. 36, a capacitive coupling between the input winding 191a and the output winding 193 is cancelled out with the cancellation winding 192a, and as illustrated in FIG. 9, the number of turns of the cancellation winding 192a for cancellation may be set to be greater than that of the output winding 193.

Figure 37:
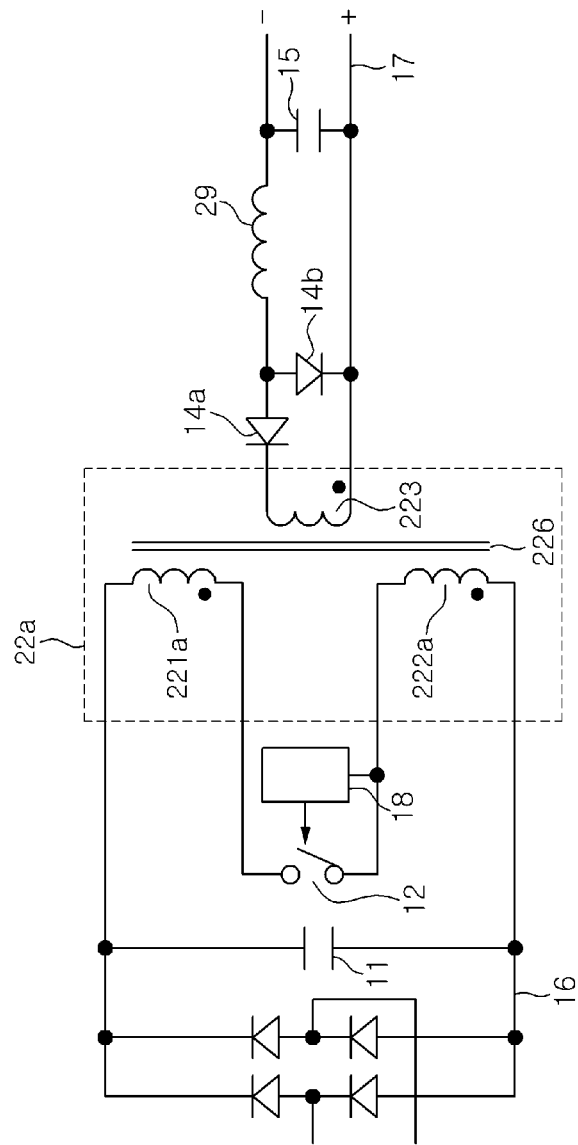

FIG. 37 is an example of a configuration diagram illustrating a forward converter to which the transformer 22a of FIG. 18 is applied.

Referring to FIG. 37, the transformer 22a transfers energy through the first input winding 221a, the second input winding 222a, and the output winding 223 with switching operation of the switching element 12 under the control of the driving circuit 18, and a capacitive coupling between the first input winding 221a and the output winding 223 is cancelled out by a capacitive coupling between the second input winding 222a and the output winding 223, and the number of turns of the second input winding 222a for cancellation may be set to be greater than that of the output winding 223. The other elements correspond to those of FIG. 36.

As described above, a flyback converter having a sandwich structure according to the present invention may have advantages such as generating far lower noise as well as transferring high efficient energy, low radiated noise due to high frequency noise cancellation, not requiring additional auxiliary windings for taking out auxiliary power sources, and having a simple structure of the transformer not requiring line filter reinforcement, thus greatly reducing the production cost.

What is claimed is:

1. A magnetic energy-transfer element used for a power supply, the power supply comprising at least one of a first input voltage terminal, a second input voltage terminal, an input filter capacitor, a switching element, and a magnetic energy-transfer element, the magnetic energy-transfer element comprising:

a core of the magnetic energy-transfer element;

an output winding wound around the core of the magnetic energy-transfer element to take out energy;

a first input winding wound around the core of the magnetic energy-transfer element, the first input winding being capacitively coupled to the output winding, the first input winding being connected between a first terminal of the input filter capacitor and a first side terminal of the switching element; and a second input winding wound around the core of the magnetic energy-transfer element, the second input winding being capacitively coupled to the output winding, the second input winding being wound to substantially fill a winding layer between the first input winding and the output winding to reduce a capacitive coupling between the first input winding and the output winding, the second input winding being connected between a second terminal of the input filter capacitor and a second side terminal of the switching element, wherein the switching element provides a path to apply voltages, the applied voltages are supplied from the input filter capacitor, and the applied voltages are dividedly fed to the first input winding and the second input winding during a switching operation of the switching element, wherein a number of turns of the second input winding wound per winding area is greater than a number of turns of the output winding wound per winding area, wherein a common-mode noise of a switching frequency component on lines of the power supply caused by a sum of the capacitive coupling between the output winding and the elements of the magnetic energy-transfer element except the second input winding during the switching operation of the switching element and a common-mode noise of the switching frequency component on lines of the power supply caused by a capacitive coupling between the second input winding and the output winding during the switching operation of the switching element are cancelled out due to their opposite polarities, and a sum of common-mode noises of the switching frequency component on lines of the power supply is decreased close to 0 Vp-p.

2. The magnetic energy-transfer element of claim 1, wherein the common-mode noise of the switching frequency component on input lines of the power supply caused by a sum of capacitive coupling between the elements of the magnetic energy-transfer element except the second input winding and the output winding during the switching operation of the switching element and the common-mode noise of the switching frequency component on the input lines of the power supply caused by a capacitive coupling between the second input winding and the output winding during the switching operation of the switching element are cancelled out due to their opposite polarities, and the sum of common-mode noises of the switching frequency component on the input lines of the power supply is decreased close to 0 Vp-p.

3. The magnetic energy-transfer element of claim 1, wherein the common-mode noise of the switching frequency component on output lines of the power supply caused by a sum of capacitive coupling between the elements of the magnetic energy-transfer element except the second input winding and the output winding during the switching operation of the switching element and the common-mode noise of the switching frequency component on the output lines of the power supply caused by the capacitive coupling between the second input winding and the output winding during the switching operation of the switching element are cancelled out due to their opposite polarities, and the sum of common-mode noises of the switching frequency component on the output lines of the power supply is decreased close to 0 Vp-p.

4. A power supply, comprising:
a magnetic energy-transfer element of claim 1.

5. A magnetic energy-transfer element used for a power supply, the power supply comprising at least one of a first input voltage terminal, a second input voltage terminal, an input filter capacitor, a switching element, and a magnetic energy-transfer element, the magnetic energy-transfer element comprising:
a core of the magnetic energy-transfer element;
an output winding wound around the core of the magnetic energy-transfer element to take out energy;
a first input winding wound around the core of the magnetic energy-transfer element, the first input winding being capacitively coupled to the output winding, the first input winding being connected between a first terminal of the input filter capacitor and a first side terminal of the switching element; and
a second input winding wound around the core of the magnetic energy-transfer element, the second input winding being capacitively coupled to the output winding, the second input winding being wound to substantially fill a winding layer between the first input winding and the output winding to reduce a capacitive coupling between the first input winding and the output winding, the second input winding having less number of turns than one half of number of turns of the first input winding, the second input winding being connected between a second terminal of the input filter capacitor and a second side terminal of the switching element, wherein flow of current and transfer of magnetic energy are switched by a switching operation of the switching element,
wherein a number of turns of the second input winding wound per winding area is greater than a number of turns of the output winding wound per winding area,
wherein the switching element provides a path to apply voltages, the applied voltages are supplied from the input filter capacitor respectively, and the applied voltages are dividedly fed to the first input winding and the second input winding during the switching operation of the switching element,
wherein a common-mode noise of a switching frequency component on lines of the power supply caused by a sum of capacitive coupling between the output winding and the elements of the magnetic energy-transfer element except the second input winding during the switching operation of the switching element and a common-mode noise of a switching frequency component on lines of the power supply caused by a capacitive coupling between the second input winding and the output winding during the switching operation of the switching element are cancelled out due to their opposite polarities and a sum of common-mode noises of the switching frequency component on lines of the power supply is decreased close to 0 Vp-p.

6. The magnetic energy-transfer element of claim 5, wherein the common-mode noise of a switching frequency component on input lines of the power supply caused by a sum of capacitive coupling between the output winding and the elements of the magnetic energy-transfer element except the second input winding during the switching operation of the switching element and the common-mode noise of the switching frequency component on input lines of the power supply caused by a capacitive coupling between the second input winding and the output winding during the switching operation of the switching element are cancelled out due to their opposite polarities, and the sum of common-mode noises of the switching frequency component on input lines of the power supply is decreased close to 0 Vp-p.

7. The magnetic energy-transfer element of claim 5, wherein the common-mode noise of a switching frequency component on output lines of the power supply caused by a sum of capacitive coupling between the output winding and the elements of the magnetic energy-transfer element except the second input winding during the switching operation of the switching element and the common-mode noise of a switching frequency component on output lines of the power supply caused by a capacitive coupling between the second input winding and the output winding during the switching operation of the switching element are cancelled out due to their opposite polarities and the sum of common-mode noises of the switching frequency component on output lines of the power supply is decreased close to 0 Vp-p.

8. A power supply, comprising:
a magnetic energy-transfer element of claim 5.

* * * * *